(12) United States Patent
Liao

(10) Patent No.: US 10,986,386 B2
(45) Date of Patent: Apr. 20, 2021

(54) VIDEO MONITORING METHOD AND DEVICE, STORAGE MEDIUM, AND ELECTRONIC DEVICE

(71) Applicant: Tencent Technology (Shenzhen) Company Limited, Shenzhen (CN)

(72) Inventor: Hancheng Liao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 88 days.

(21) Appl. No.: 16/359,784

(22) Filed: Mar. 20, 2019

(65) Prior Publication Data

US 2019/0222877 A1 Jul. 18, 2019

Related U.S. Application Data

(63) Continuation of application No. PCT/CN2018/075777, filed on Feb. 8, 2018.

(30) Foreign Application Priority Data

Feb. 24, 2017 (CN) .......................... 201710107411.4

(51) Int. Cl.
*H04N 21/24* (2011.01)
*H04N 17/04* (2006.01)
(Continued)

(52) U.S. Cl.
CPC ......... *H04N 21/2407* (2013.01); *H04N 7/181* (2013.01); *H04N 17/04* (2013.01);
(Continued)

(58) Field of Classification Search
CPC ............. H04N 21/2407; H04N 21/231; H04N 21/2393; H04N 21/24; H04N 21/258; H04N 21/262; H04N 7/181; H04N 17/04
See application file for complete search history.

(56) References Cited

U.S. PATENT DOCUMENTS 8,539,286 B1 9/2013 Shintani et al.
2004/0002984 A1* 1/2004 Hasegawa ............... H04N 7/185
(Continued)

FOREIGN PATENT DOCUMENTS

CN 105978910 A 9/2016
CN 106060663 A 10/2016
CN 106101825 A 11/2016

OTHER PUBLICATIONS

Tencent Technology, WO, PCT/CN2018/075777, dated Apr. 28, 2018, 3 pgs.
(Continued)

*Primary Examiner* — Jefferey F Harold
*Assistant Examiner* — Franklin S Andramuno
(74) *Attorney, Agent, or Firm* — Morgan, Lewis & Bockius LLP

(57) ABSTRACT

The present disclosure disclose a video surveillance method performed at a sever. After sending first video information of a target video to a first client, the server receives reported information indicating a playback state of the target video from the first client. The reported information is obtained when the first client plays a video source file of the target video according to original address information and updates a first-frame playback time stored on a first location in a multi-dimensional table according to a first first-frame playback time in the reported information. The server then obtains, according to the first-frame playback time, a timeout waiting time in second video information and sends the second video information to a second client. When the second client does not play the target video in the timeout waiting time, the playback state of the target video is determined as unsuccessful playback.

20 Claims, 14 Drawing Sheets

(51) Int. Cl.
   *H04N 21/462*   (2011.01)
   *H04N 21/658*   (2011.01)
   *H04N 7/18*     (2006.01)
   *H04N 21/262*   (2011.01)
   *H04N 21/4425*  (2011.01)
   *H04N 21/258*   (2011.01)
   *H04N 21/239*   (2011.01)
   *H04N 21/231*   (2011.01)
   *H04N 21/442*   (2011.01)
   *H04N 21/6437*  (2011.01)

(52) U.S. Cl.
   CPC ....... *H04N 21/231* (2013.01); *H04N 21/2393* (2013.01); *H04N 21/24* (2013.01); *H04N 21/258* (2013.01); *H04N 21/262* (2013.01); *H04N 21/442* (2013.01); *H04N 21/4425* (2013.01); *H04N 21/4622* (2013.01); *H04N 21/6437* (2013.01); *H04N 21/658* (2013.01); *H04N 21/6581* (2013.01)

(56) References Cited

U.S. PATENT DOCUMENTS

| | | | |
|---|---|---|---|
| 2010/0201815 A1* | 8/2010 | Anderson | H04N 7/185 348/148 |
| 2011/0251987 A1* | 10/2011 | Buchheit | H04L 65/4076 706/46 |
| 2012/0169842 A1* | 7/2012 | Chuang | G08B 13/19619 348/39 |
| 2015/0346812 A1* | 12/2015 | Cole | G06F 3/017 345/156 |
| 2015/0382060 A1 | 12/2015 | Dunne et al. | |
| 2016/0044385 A1* | 2/2016 | Kareeson | G06Q 20/3224 725/27 |

OTHER PUBLICATIONS

Tencent Technology, IPRP, PCT/CN2018/075777, dated Aug. 27, 2019, 4 pgs.

Tencent Technology, ISR, PCT/CN2018/075777, dated Apr. 28, 2018, 2 pgs.

* cited by examiner

VIDEO MONITORING METHOD AND DEVICE, STORAGE MEDIUM, AND ELECTRONIC DEVICE

CROSS-REFERENCE TO RELATED APPLICATIONS

This application is a continuation application of PCT/CN2018/075777, entitled "VIDEO MONITORING METHOD AND DEVICE, STORAGE MEDIUM AND ELECTRONIC DEVICE" filed on Feb. 8, 2018, which claims priority to Chinese Patent Application No. 201710107411.4, entitled "VIDEO SURVEILLANCE METHOD AND APPARATUS" filed with the Patent Office of China on Feb. 24, 2017, both of which are incorporated by reference in their entirety.

FIELD OF THE TECHNOLOGY

Embodiments of the present disclosure relate to the video field, and specifically, to a video surveillance method and apparatus, a storage medium, and an electronic apparatus.

BACKGROUND OF THE DISCLOSURE

Currently, a server periodically initiates a request to a video content provider (CP) to which all aggregate videos belong, captures the request, reads Hypertext Markup Language (HTML for short) data of a video detail page of the CP, analyzes returned packet data requested from a content delivery network (CDN for short) of the CP, and determines whether a video is invalidated.

However, when numerous videos need to be detected, the foregoing solution has a time validity problem. Because numerous videos need to be detected, a relatively long time is required to complete a round of detection on each video. When a video is invalidated between two rounds of detection, detection efficiency is relatively low (it is found through a test that when such a solution is used to detect ten thousands of videos, approximately 20 minutes are required, that is, sensitivity of the solution is 20 minutes). As a result, video surveillance efficiency is low.

Additionally, because a quantity of servers that may be used for capturing is limited and most of the servers are centrally deployed, successful playback or unsuccessful playback at a place cannot represent the same playback result at another place. A server excessively frequently initiates a request to a video detail page of the CP. Consequently, the CP performs frequent control to cause a large-range detection error. As a result, video surveillance efficiency is low.

For the foregoing problem of low video surveillance efficiency, no effective solution has been proposed currently.

SUMMARY

Embodiments of the present disclosure provide a video surveillance method and apparatus, a storage medium, and an electronic apparatus, so as to resolve at least a technical problem of low video surveillance efficiency in the related technology.

According to a first aspect of the embodiments of the present disclosure, a video surveillance method is provided and performed at a server having one or more processors and memory storing a plurality of programs to be executed by the one or more processors. The video surveillance method includes: sending first video information of a target video to a first client in response to a first request from the first client, the target video being played by an aggregate video website; receiving reported information that is used to indicate a playback state of the target video and that is sent by the first client, the reported information being obtained by playing, by the first client, a video source file of the target video according to original address information in the first video information; updating a first-frame playback time stored on a first location in a multi-dimensional table according to a first first-frame playback time in the reported information, dimensions in the multi-dimensional table being respectively used to indicate different pieces of playback information of a video, and the first location is determined according to the reported information; obtaining, according to the first-frame playback time, a timeout waiting time in second video information sent to a second client; and sending the second video information to the second client in response to a second request from the second client, when the second client does not play the target video in the timeout waiting time, the playback state of the target video being determined as unsuccessful playback.

According to a second aspect of the embodiments of the present disclosure, a server for video surveillance is further provided. The server includes one or more processors, and one or more memories for storing program units that, when executed by the processor, cause the server to perform the aforementioned video surveillance method.

According to a third aspect of the embodiments of the present disclosure, a non-transitory computer readable storage medium is further provided. The storage medium stores a computer program, and when being run, the computer program is configured to perform the aforementioned video surveillance method according to the embodiments of the present disclosure.

According to a fourth aspect of the embodiments of the present disclosure, an electronic apparatus is further provided. The electronic apparatus includes a memory and a processor, where the memory stores a computer program, and the processor is configured to perform the aforementioned video surveillance method according to the embodiments of the present disclosure by using the computer program.

In the embodiments of the present disclosure, first video information of a target video is sent to a first client in response to a first request, where the target video is played by an aggregate video website; reported information that is used to indicate a playback state of the target video and that is sent by the first client is received, where the reported information is obtained by playing, by the first client, a video source file of the target video according to original address information in the first video information; a first-frame playback time stored on a first location in a multi-dimensional table is updated according to a first first-frame playback time in the reported information, where dimensions in the multi-dimensional table are respectively used to indicate different pieces of playback information of a video, and the first location is determined according to the reported information; a timeout waiting time in second video information sent to a second client is obtained according to the first-frame playback time; and the second video information is sent to the second client in response to a second request, where when the second client does not play the target video in the timeout waiting time, the playback state of the target video is determined as unsuccessful playback. The first-frame playback time stored on the first location in the multi-dimensional table is updated according to the first first-frame playback time in the reported information that is used to indicate the playback state of the target video and that is sent by the first client, then the timeout waiting time in the second video information sent to the second client is obtained according to the first-frame playback time, and the second video information is sent to the second client, where when the second client does not play the target video in the timeout waiting time, the playback state of the target video is determined as unsuccessful playback. That is to say, the video surveillance method based on crowdsourcing reporting implements, to avoid a case in which a server frequently initiates a request to cause low video surveillance efficiency, quickly determine whether the target video invalidated, improve video surveillance efficiency, and further resolve the technical problem of low video surveillance efficiency in the related technology.

BRIEF DESCRIPTION OF THE DRAWINGS

Accompanying drawings described herein are used to provide further understanding about the embodiments of the present disclosure, and constitute one portion of the present disclosure; and schematic embodiments of the present disclosure and their description are used to explain the present disclosure, and do not constitute an inappropriate limit on the present disclosure. In the figures.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, the specification and claims of the present disclosure, and terms "first" and "second" in the foregoing accompanying drawings are used to distinguish similar objects, but are unnecessarily used to describe a specific sequence or order. It should be understood that, data used in this way can be interchanged in an appropriate case, so that the embodiments of the present disclosure that are described herein can be implemented in a sequence other than those sequences illustrated or described herein. In addition, terms "include" and "have" and any of their variations are intended to cover nonexclusive including, for example, a process, method, system, product, or device that includes a series of steps or units does not have to be limited to those clearly listed steps or units, but may include another step or unit that is not clearly listed or is inherent to the process, method, product, or device.

According to an aspect of the embodiments of the present disclosure, an embodiment of a video surveillance method is provided.

Figure 1:
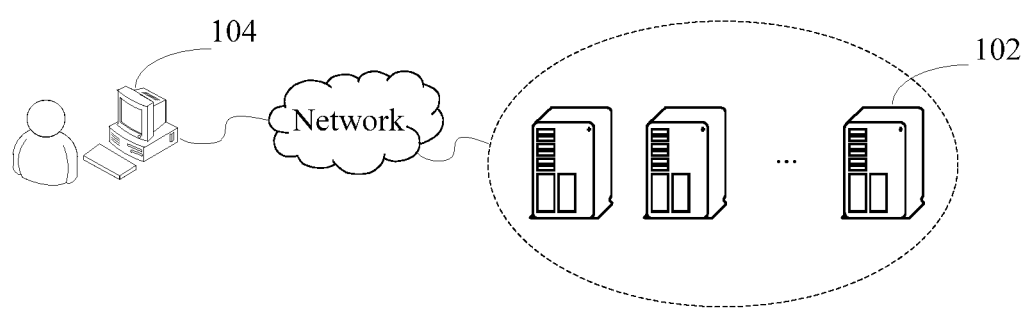
FIG. 1 is a schematic diagram of a hardware environment of a video surveillance method according to an embodiment of the present disclosure.

In some embodiments, in this embodiment, the foregoing video surveillance method may be applied to a hardware environment that is formed by a server 102 and a terminal 104 and that is shown in FIG. 1. FIG. 1 is a schematic diagram of a hardware environment of a video surveillance method according to an embodiment of the present disclosure. As shown in FIG. 1, the server 102 is connected to the terminal 104 by using a network, the foregoing network includes but is not limited to: a wide area network, a metropolitan area network, or a local area network, and the terminal 104 is not limited to a PC, a mobile phone, a tablet computer, or the like. The video surveillance method according to this embodiment of the present disclosure may be performed by the server 102, may be performed by the terminal 104, or may be performed by the server 102 and the terminal 104 jointly. The video surveillance method according to this embodiment of the present disclosure performed by the terminal 104 may alternatively be performed by a client installed on the terminal 104.

The video surveillance method according to this embodiment of the present disclosure is described below from a side of the server.

Figure 2:
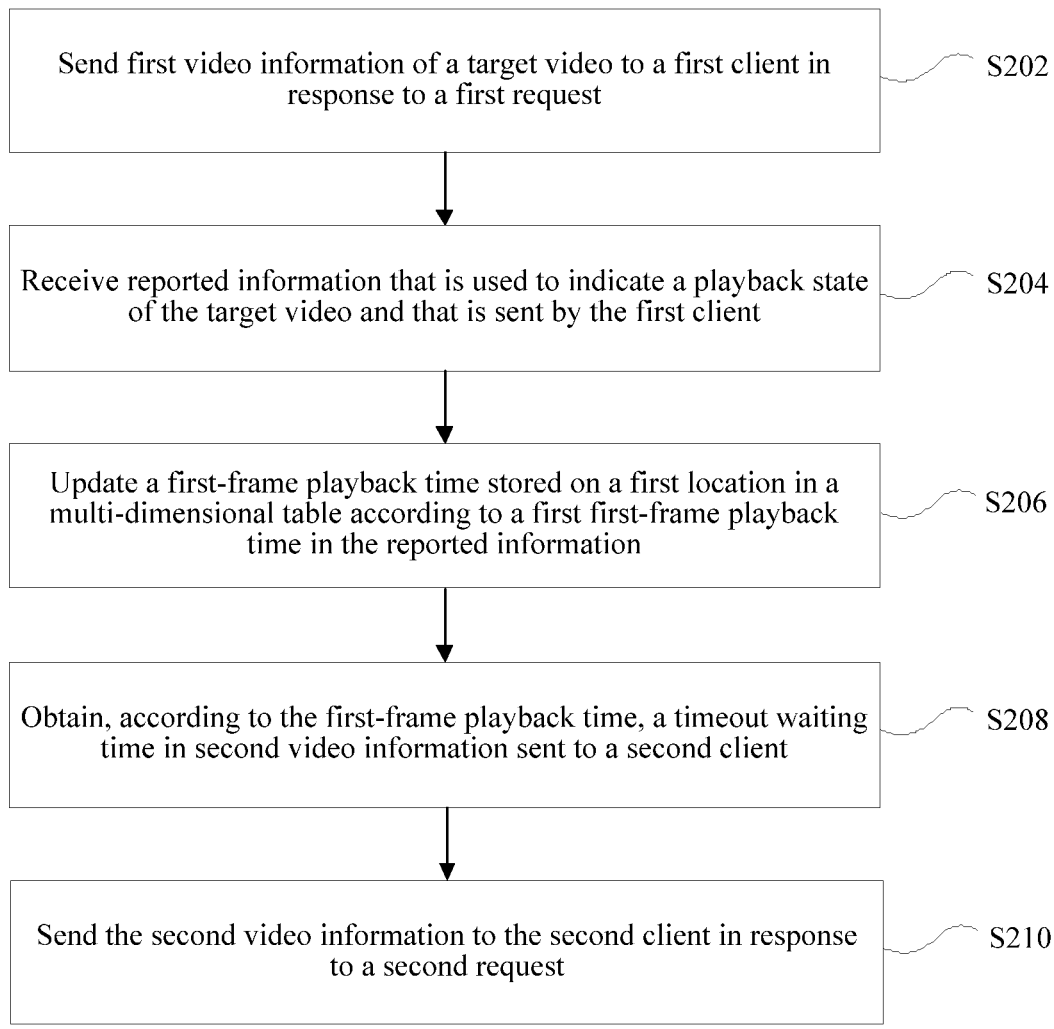
FIG. 2 is a flowchart of a video surveillance method according to an embodiment of the present disclosure.

FIG. 2 is a flowchart of a video surveillance method according to an embodiment of the present disclosure. As shown in FIG. 2, the video surveillance method may include the following steps:

Step S202. Send first video information of a target video to a first client in response to a first request.

In a technical solution provided in step S202 of the present disclosure, the target video is played by an aggregate video website.

An aggregate video website (WEB APP) is a low-frequency website that collects, in a form such as a crawler or interface cooperation, video content provided by video CPs, performs secondary integration, and provides the video content to a user for watching. The user may access an aggregate website by using a client, to watch videos of the video CPs. The target video in this embodiment is a to-be-monitored video, the first client accesses the aggregate video website, and sends, to a server, the first request used to request video data of the target video, and the server delivers the first video information to the first client in response to the first request. In some embodiments, the first video information includes basic information of the target video, a timeout waiting time used by a second client to judge, when playing the target video, whether playback of the target video times out, a playback address of the target video, and an alternate address of the target video, where the alternate address of the target video is another trusted link address for playing a source file of the target video when the video source file provided by a CP of the target video is invalidated, thereby switching the invalidated video source file, the playback address of the target video includes original address information of the target video, and the original address information is address information of the target video on the CP.

In consideration of factors such as copyright, storage, and broadband costs, the aggregate video website does not store or aggregate video source files of the CPs, but instead when the user watches the target video by using the first client, the original address information of the target video on the CP is directly delivered, where the original address information is a CP playback address.

Step S204. Receive reported information that is used to indicate a playback state of the target video and that is sent by the first client.

In a technical solution provided in step S204 of the present disclosure, the reported information is obtained by playing, by the first client, a video source file of the target video according to original address information in the first video information.

After sending the first video information of the target video to the first client in response to the first request, the server may deliver the original address information of the target video to the first client by using the Hypertext Transfer Protocol (HTTP), so that the first client performs loading and waits for playback.

After the server delivers the first video information, the first client establishes a video tag according to the original address information, and establishes a first time stamp. The first client obtains the video source file of the target video according to the original address information, and plays the video source file. After playing the video source file of the target video according to the original address information in the first video information, the first client detects the playback state of the target video. If the target video begins to be played, the video tag should trigger a first preset event, and the first preset event may be an event used to indicate that the playback state of the target video is a successful playback state. For example, the first preset event is used to indicate that the target video begins to be played.

When the first preset event is triggered, a second time stamp is established, and a time difference between the second time stamp and the first time stamp is a first-frame consumed time of current playback of the target video. When the first preset event is triggered, a playback time of the target video is monitored. When it is found that a playback progress of the target video is greater than a preset time, it is determined that the target video is successfully played when the video source file of the target video is played according to the original address information in the first video information. In some embodiments, when the first client detects the playback state of the target video, if playback of the target video has an error, for example, no video frame in the target video is successfully played, the video tag triggers a second preset event. The second preset event may be an event used to indicate that the playback state of the target video is an unsuccessful playback state. For example, the second preset event is used to indicate that playback of the target video has an error.

When the second preset event is triggered, a third time stamp is established, where a time difference between the third time stamp and the first time stamp is a consumed time of unsuccessful playback of the target video. In some embodiments, when the first client detects the playback state of the target video, if the target video is not played immediately and does not have an error either, the first client continuously waits until the first preset event is triggered, or the second preset event is triggered, or the timeout waiting time of the playback state of the first client is judged.

After the first client detects the playback state of the target video, the server receives the reported information that is used to indicate the playback state and that is sent by the first client after playing the video source file of the target video according to the original address information in the first video information and detecting the playback state of the target video. In some embodiments, the reported information includes information used to indicate the playback state of the target video. In some embodiments, in addition to the information used to indicate the playback state of the target video, such as, information for reporting successful playback of the target video or information for reporting unsuccessful playback of the target video, the reported information further includes an IP of a client used to play the target video, and a user identity used to log in to a client, for example, includes a globally unique identifier (GUID for short) in a user browser, and further includes information such as the ID of the played target video, a playback source address, a playback source number, a first-frame consumed time of playback of the target video, and a network state.

Step S206. Update a first-frame playback time stored on a first location in a multi-dimensional table according to a first first-frame playback time in the reported information.

In a technical solution provided in step S206 of the present disclosure, dimensions in the multi-dimensional table are respectively used to indicate different pieces of playback information of a video, and the first location is determined according to the reported information.

The server establishes a multi-dimensional table, and the multi-dimensional table may be used to store a first-frame consumed time of playback of the target video. In some embodiments, dimensions of the multi-dimensional table are respectively used to indicate a source number, a region of a client during video playback, and a network type of a client during video playback. A source number to which the playback address belongs may be obtained through parsing by using the playback source number, a region in which the user is located is obtained through parsing according to the ID of the target video or the user identity, a network type of playback of the target video is determined, and a storage location of a currently reported first-frame consumed time in a three-dimensional table is determined according to the region to which the target video belongs, the source number, and the network type.

After the reported information that is used to indicate the playback state of the target video and that is sent by the first client is received, the first-frame playback time stored on the first location in the multi-dimensional table is updated according to the first first-frame playback time in the reported information, where the first location is determined according to the reported information. Dimensions in the multi-dimensional table are respectively used to indicate different pieces of playback information of a video. For example, the multi-dimensional table is a three-dimensional table, and dimensions of the three-dimensional table are respectively used to indicate a source number of a video, a region of a client during video playback, and a network type of a client during video playback.

Step S208. Obtain, according to the first-frame playback time, a timeout waiting time in second video information sent to a second client.

In a technical solution provided in step S208 of the present disclosure, a timeout waiting time in second video information sent to a second client is obtained according to the first-frame playback time.

After the first-frame playback time stored on the first location in a multi-dimensional table is updated according to the first first-frame playback time in the reported information, a timeout waiting time in second video information sent to a second client is obtained according to the first-frame playback time. In some embodiments, the server summarizes the multi-dimensional table every preset time, for example, summarizes an average value of first-frame consumed times stored in the multi-dimensional table, and then obtains the timeout waiting time that is used by the second client to judge, when playing the target video, whether playback of the target video times out and that is sent to the second client.

Step S210. Send the second video information to the second client in response to a second request.

In a technical solution provided in step S210 of the present disclosure, when the second client does not play the target video in the timeout waiting time, the playback state of the target video is determined as unsuccessful playback.

After the timeout waiting time in the second video information sent to the second client is obtained according to the first-frame playback time, the second request that is sent by the second client and that is used to request the video data of the target video is received, and the server sends the second video information including the timeout waiting time to the second client in response to the second request.

In some embodiments, after the second video information is sent to the second client in response to the second request, the reported information that is used to indicate the playback state of the target video and that is sent by the second client is received, where the reported information sent by the second client is obtained by playing, by the second client, the video source file of the target video according to the original address information in the second video information. A first-frame playback time stored on a second location in the multi-dimensional table is updated according to the first first-frame playback time in the reported information sent by the second client, where the second location is determined according to the reported information sent by the second client; a timeout waiting time in third video information sent to a third client is obtained according to the first-frame playback time; and the third video information is sent to the third client in response to a third request, where when the third client does not play the target video in the timeout waiting time, the playback state of the target video is determined as unsuccessful playback. Therefore, numerous clients report whether video playback is successful and corresponding information, and report a consequence generated for a behavior. To be specific, the video surveillance method based on crowdsourcing reporting is implemented, and further whether the target video is invalidated is quickly determined, thereby improving video surveillance efficiency.

A method for subsequent interaction between the server and the third client is the same as an execution process between the server and the first client, and an execution process between the server and the second client. Details are not described herein again.

In some embodiments, the server establishes structural body information according to the ID of the target video in the reported information, the structural body information may include information such as a video number of the target video, a video type of the target video, a video source of the target video, a quantity of successful playback times of the target video, a quantity of unsuccessful playback times of the target video, and a playback success rate of the target video, and the structural body information may be established by using a field. In some embodiments, if structural body information corresponding to the ID of the target video has existed, the structural body information is updated by using the currently established structural body information.

In some embodiments, if a quantity of times of reporting the ID of the target video in one round is greater than a preset quantity of times, the target video is determined as a highly frequently played video, and the video is placed into a precedence analysis queue. In each round, the server summarizes the precedence analysis queue. When the precedence analysis queue is summarized, whether the target video is normally played and whether the target video is invalidated are determined, and then different processing manners are taken for the normally played video and the invalidated video, thereby improving video surveillance efficiency.

By performing step S202 to step S210, the first video information of the target video is sent to the first client in response to the first request; the reported information sent by the first client is received; the first-frame playback time stored on the first location in the multi-dimensional table is updated according to the first first-frame playback time in the reported information; the timeout waiting time in the second video information sent to the second client is obtained according to the first-frame playback time; and the second video information is sent to the second client in response to the second request, thereby monitoring a playback process of the target video instead of using the server to periodically initiate a request to a video detail page to which all aggregate videos belong, read HTML data of a video detail page of a CP, and perform web page layout analysis, or constructing a corresponding video playback request, to initiate a request to a CDN of a CP and analyze a returned packet to draw a conclusion about whether a video is invalidated, so as to avoid a large-range video surveillance error caused by frequent control performed by a CP due to excessively frequently initiating a request to the CP, further quickly determine whether the target video is invalidated, thereby improving video surveillance efficiency, and further resolving the technical problem of low video surveillance efficiency in the related technology.

In an optional implementation, step S202 of sending first video information of a target video to a first client in response to a first request includes: sending the first video information including alternate address information to the first client in response to the first request, where the alternate address information is address information of the video source file on a CDN, so that when the playback state is unsuccessful playback of the target video, the first client plays the target video according to the video source file stored on the CDN.

When a front end requests data of a video from a background, the background not only delivers basic information and a playback address of the video, but also delivers an alternate address, and this address is usually a link of the video on a trusted CDN. The aggregate video website does not store or aggregate video source files of the CPs, but instead when the user watches a video, an original playback address of the video on a CP is directly delivered. In consideration of improving user experience, a better solution of the aggregate video website is to store a video source file in a trusted CDN of the aggregate video website, so that when the playback state is unsuccessful playback of the target video, the target video is played according to the video source file. In consideration of costs, if a client may normally play a source file of a CP, the aggregate video website does not need to actually use downlink bandwidth of the CDN of the aggregate video web site. However, when the source file of the CP is invalidated, the aggregate video website may intelligently switch to the trusted CDN to ensure user experience. In consideration of a complex network environment, when loading the source file of the CP, the client may immediately return success or failure (this is usually related to a validation mechanism of the CP).

In an optional implementation, step S206 of updating a first-frame playback time stored on a first location in a multi-dimensional table according to a first first-frame playback time in the reported information includes: obtaining, according to the reported information, a first playback region to which the first client belongs; determining the first location in the multi-dimensional table according to a first source number of the target video, the first playback region, and a first network type of the target video; and updating the first-frame playback time stored on the first location according to the first first-frame playback time in the reported information.

Figure 3:
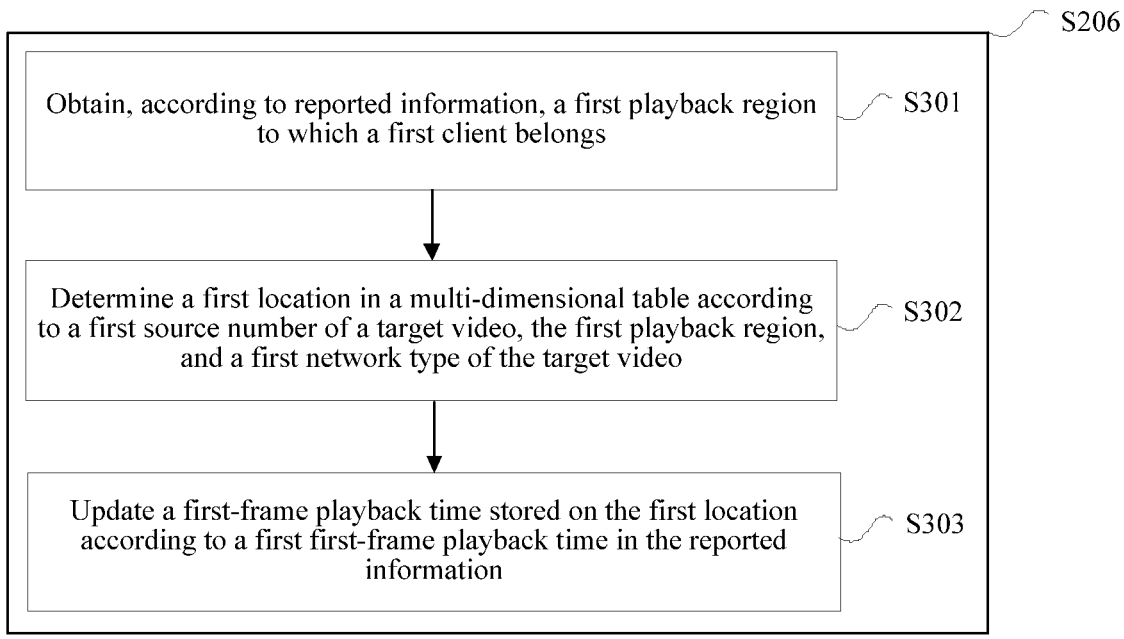
FIG. 3 is a flowchart of a method for updating a first-frame playback time stored on a first location in a multi-dimensional table according to a first first-frame playback time in reported information according to an embodiment of the present disclosure.

FIG. 3 is a flowchart of a method for updating a first-frame playback time stored on a first location in a multi-dimensional table according to a first first-frame playback time in reported information according to an embodiment of the present disclosure. As shown in FIG. 3, the video surveillance method includes the following steps:

Step S301. Obtain, according to reported information, a first playback region to which a first client belongs.

In a technical solution provided in step S301 of the present disclosure, the reported information includes an ID of a target video and a user identity. After the reported information sent by the first client in the playback state of loading the video source file of the target video according to the original address information in the first video information and playing the target video according to the video source file is received, the first playback region to which the first client belongs is obtained through parsing according to the reported information, and the first playback region may be identified by using a number. In some embodiments, a region in which a user is located is obtained through parsing according to an ID of the target video or the user identity, and the region may be accurate to a municipal level.

Step S302. Determine a first location in a multi-dimensional table according to a first source number of a target video, the first playback region, and a first network type of the target video.

In a technical solution provided in step S302 of the present disclosure, the first video information includes the first source number and the first network type, and dimensions in the multi-dimensional table are respectively used to indicate a source number of a video, a playback region, and a network type.

In some embodiments, a three-dimensional table is established, dimensions of the three-dimensional table are respectively used to indicate a source number, a playback region, and a network type. To be specific, an axis X of the three-dimensional table corresponds to the source number, an axis Y corresponds to the playback region, an axis Z corresponds to the network type, and the three-dimensional table may be used to store a first-frame playback time of a video determined according to the source number, the playback region, and the network type. The first video information includes the first source number and the first network type, a source at which a playback address of the target video is located may be obtained through parsing according to the first source number, and a network state may be determined according to the first network type. The first location in the multi-dimensional table is determined according to the first source number of the target video, the first playback region, and the first network type of the target video.

Step S303. Update a first-frame playback time stored on the first location according to a first first-frame playback time in the reported information.

In a technical solution provided in step S303 of the present disclosure, the reported information includes the first first-frame playback time. After the first location in the multi-dimensional table is determined according to the first source number of the target video, the first playback region, and the first network type of the target video, the first first-frame playback time is stored on the first location of the multi-dimensional table. When the first-frame playback time has been stored on the first location, the stored first-frame playback time is updated according to the first first-frame playback time.

In this embodiment, the first playback region to which the first client belongs is obtained according to the reported information; the first location in the multi-dimensional table is determined according to the first source number of the target video, the first playback region, and the first network type of the target video, where the first video information includes the first source number and the first network type, and dimensions in the multi-dimensional table are respectively used to indicate a source number of a video, a playback region, and a network type; and the first-frame playback time stored on the first location is updated according to the first first-frame playback time in the reported information, so as to store the first-frame playback time, thereby updating the first-frame playback time stored on the first location in the multi-dimensional table according to the first first-frame playback time in the reported information.

In an optional implementation, step S303 of updating a first-frame playback time stored on the first location according to a first first-frame playback time in the reported information includes: obtaining an average playback time of the first first-frame playback time and a second first-frame playback time if the second first-frame playback time is stored on the first location; and updating the second first-frame playback time to the average playback time.

Figure 4:
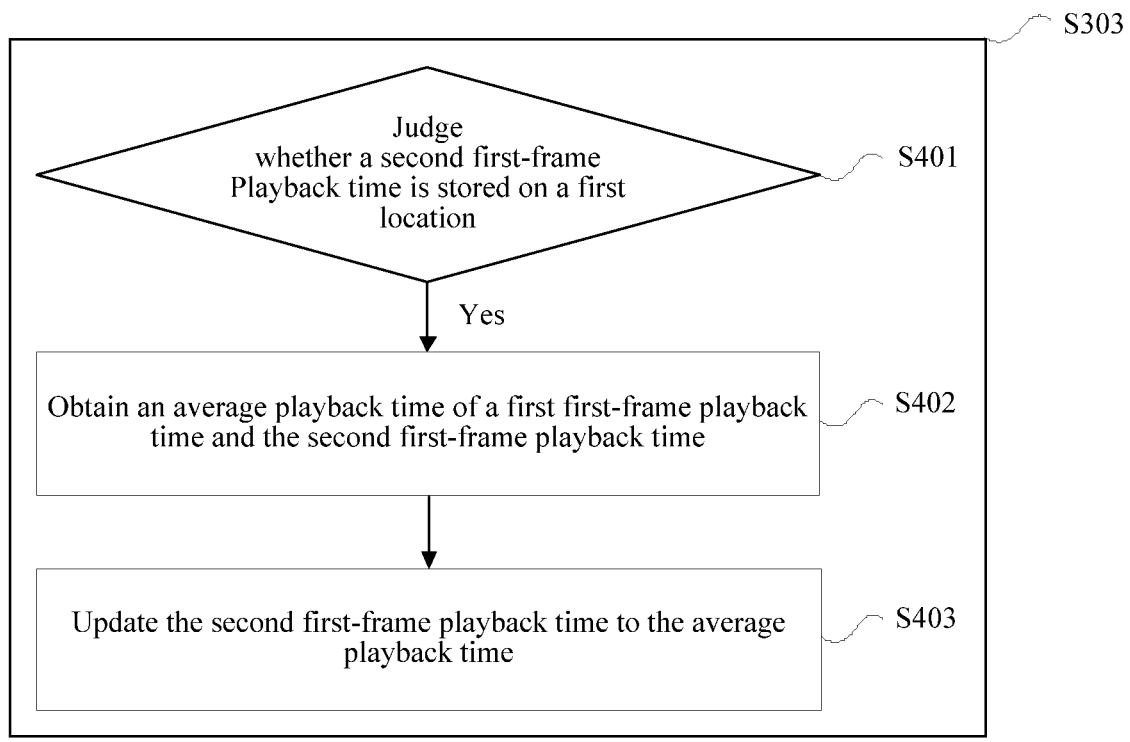
FIG. 4 is a flowchart of a method for updating a first-frame playback time stored on a first location according to a first first-frame playback time in reported information according to an embodiment of the present disclosure.

FIG. 4 is a flowchart of a method for updating a first-frame playback time stored on a first location according to a first first-frame playback time in reported information according to an embodiment of the present disclosure. As shown in FIG. 4, the method includes the following steps:

Step S401. Judge whether a second first-frame playback time is stored on a first location.

In a technical solution provided in step S401 of the present disclosure, after a first-frame playback time stored on the first location is updated according to a first first-frame playback time in reported information, whether the second first-frame playback time is stored on the first location is judged. To be specific, whether the first-frame playback time has been stored on the first location is judged, and the stored first-frame playback time is the second first-frame playback time. If it is judged that the second first-frame playback time is stored on the first location, step S402 is performed.

Step S402. Obtain an average playback time of a first first-frame playback time and the second first-frame playback time.

In a technical solution provided in step S402 of the present disclosure, if it is judged that the second first-frame playback time is stored on the first location, to be specific, the first-frame playback time has been stored on the first location, the average playback time of the first first-frame playback time and the second first-frame playback time is obtained.

Step S403. Update the second first-frame playback time to the average playback time.

In a technical solution provided in step S403 of the present disclosure, after the average playback time of the first first-frame playback time and the second first-frame playback time is obtained, the second first-frame playback time is updated to the average playback time.

For example, a first-frame consumed time currently reported by a client for a target video is placed in a multi-dimensional table. For example, when a user whose playback region is Shenzhen (which has a region number 92) plays an iQIYI video (which has a source number 3) in an environment of a telecommunications network (which has a network type number 1), the first location of the multi-dimensional table is determined according to the source number, the playback region, and the network type, the first location is determined by 3 on an axis X, 92 on an axis Y, and 1 on an axis Z, and a first-frame consumed time, namely, 2 seconds is stored on the first location. Whether a first-frame consumed time has been stored on the first location is judged. If it is judged that the first-frame consumed time has been stored on the first location, an average value is obtained by averaging the first-frame consumed time stored on the location and the first-frame consumed time, namely, 2 seconds, and the foregoing average value is stored on the first location.

In this embodiment, whether the second first-frame playback time is stored on the first location is judged; the average playback time of the first first-frame playback time and the second first-frame playback time is obtained if it is judged that the second first-frame playback time is stored on the first location; and the second first-frame playback time is updated to the average playback time, so as to update the first-frame playback time stored on the first location according to the first first-frame playback time in the reported information.

In an optional implementation, step S208 of obtaining, according to the first-frame playback time, a timeout waiting time in second video information sent to a second client includes: summarizing, according to a preset parameter every preset time, the first-frame playback time stored on the first location, to obtain the timeout waiting time, where the first-frame playback time is updated with the first video information sent by the first client at different times.

In some embodiments, the preset time is 5 minutes, a server summarizes a three-dimensional table in last 5 minutes every 5 minutes, and the three-dimensional table may be summarized according to the preset parameter. For example, if the preset parameter is 1.2, the three-dimensional table is summarized according to an average value*1.2, to obtain a new timeout waiting time of an operator in a region for a source. In this way, when receiving a next request of a client for requesting video data of the target video, the server may deliver the new timeout waiting time, thereby determining a playback state of the target video according to the proper timeout waiting time. When the target video reaches the timeout waiting time, the server receives the reported information indicating that the playback state of the target video is unsuccessful playback, thereby improving video surveillance efficiency.

In an optional implementation, after the reported information that is used to indicate the playback state of the target video and that is sent by the first client is received, a first structural body corresponding to the ID of the target video is established according to the reported information, where the reported information includes the ID of the target video, and the first structural body is used to indicate the reported information by using a preset field.

The reported information includes the ID of the target video, and the first structural body corresponding to the ID of the target video that is established according to the reported information is indicated by using a field name and a field type. In some embodiments, the first structural body includes a video number, a video type, and a video source of the target video, and further includes a quantity of successful playback times, a quantity of unsuccessful playback times, and a playback success rate of the target video, where field types corresponding to the video number, the video type, and the video source of the target video, and the quantity of successful playback times and the quantity of unsuccessful playback times of the target video may be numeric types, and a field type corresponding to the success rate may be a floating-point type.

In an optional implementation, the establishing a first structural body corresponding to an ID of the target video according to the reported information includes: if it is judged that a second structural body corresponding to the ID of the target video exists, updating the second structural body to the first structural body.

Figure 5:
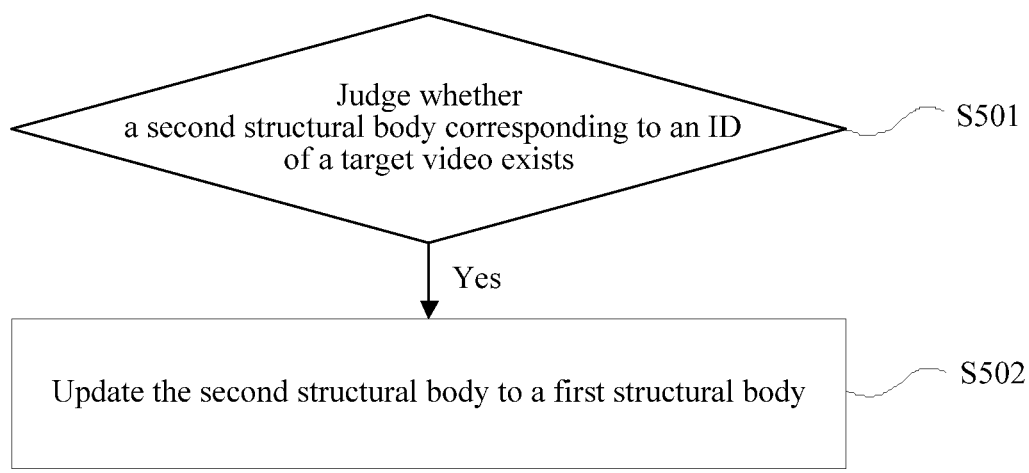
FIG. 5 is a flowchart of a method for establishing a first structural body corresponding to an ID of a target video according to reported information according to an embodiment of the present disclosure.

FIG. 5 is a flowchart of a method for establishing a first structural body corresponding to an ID of a target video according to reported information according to an embodiment of the present disclosure. As shown in FIG. 5, the method for establishing a first structural body corresponding to an ID of a target video according to reported information includes the following steps:

Step S501. Judge whether a second structural body corresponding to an ID of a target video exists.

In a technical solution provided in step S501 of the present disclosure, when a first structural body corresponding to the ID of the target video is established according to reported information, whether the second structural body corresponding to the ID of the target video exists, that is, whether a structural body corresponding to the ID of the target video has been established is judged, and the established structural body is the second structural body.

Step S502. Update the second structural body to a first structural body.

In a technical solution provided in step S502 of the present disclosure, the second structural body is updated to the first structural body if it is judged that the second structural body corresponding to the ID of the target video exists.

After whether the second structural body corresponding to the ID of the target video exists is judged, the second structural body is updated to the first structural body if it is judged that the second structural body corresponding to the ID of the target video exists.

In this embodiment, whether the second structural body corresponding to the ID of the target video exists is judged; and the second structural body is updated to the first structural body if it is judged that the second structural body corresponding to the ID of the target video exists, so as to establish the first structural body corresponding to the ID of the target video according to reported information.

In an optional implementation, after the second structural body is updated to the first structural body, if a quantity of reporting times of the ID of the target video is greater than a preset quantity of times, the ID of the target video is stored in a preset queue.

Figure 6:
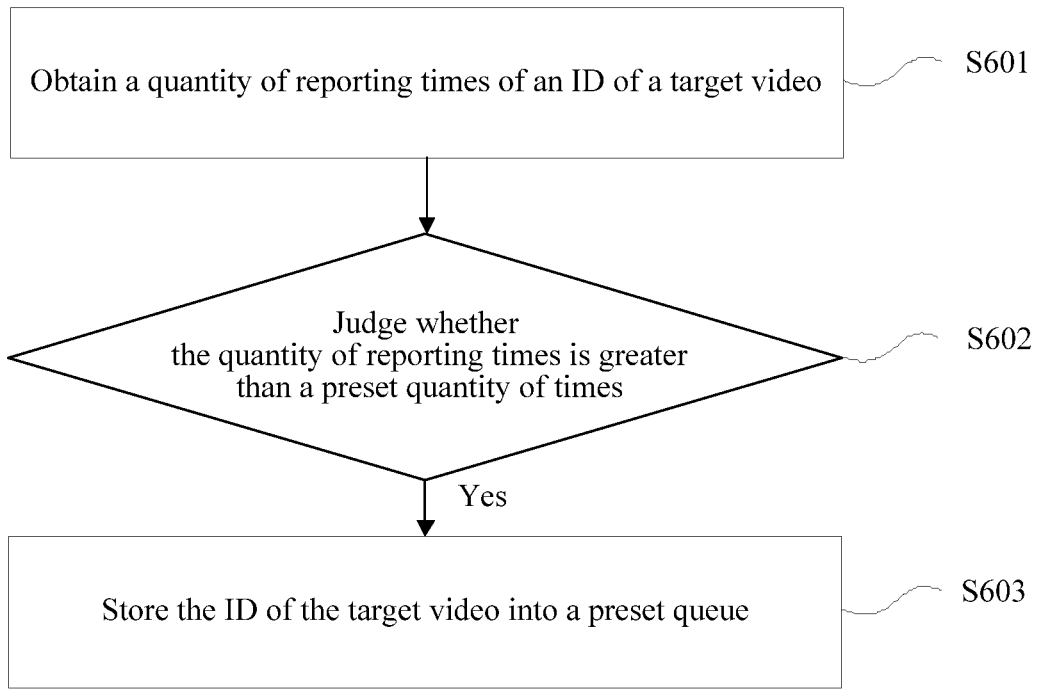
FIG. 6 is a flowchart of another video surveillance method according to an embodiment of the present disclosure.

FIG. 6 is a flowchart of another video surveillance method according to an embodiment of the present disclosure. As shown in FIG. 6, the video surveillance method further includes the following steps:

Step S601. Obtain a quantity of reporting times of an ID of a target video.

In a technical solution provided in step S601 of the present disclosure, after a second structural body is updated to a first structural body, a quantity of reporting times of the ID of the target video in one round is obtained. For example, if one round lasts for 5 minutes, a quantity of reporting times of the ID of the target video in 5 minutes is obtained.

Step S602. Judge whether the quantity of reporting times is greater than a preset quantity of times.

In a technical solution provided in step S602 of the present disclosure, after a quantity of reporting times of the ID of the target video is obtained, whether the quantity of reporting times is greater than the preset quantity of times is judged. For example, if the preset quantity of times is 200, whether a quantity of reporting times in one round is greater than 200 is judged. If it is judged that the quantity of reporting times is greater than the preset quantity of times, step S603 is performed.

Step S603. Store the ID of the target video into a preset queue.

In a technical solution provided in step S603 of the present disclosure, the ID of the target video is stored into the preset queue if it is judged that the quantity of reporting times is greater than the preset quantity of times, where the preset queue is used to store IDs of a plurality of videos, and a quantity of reporting times of each video of the plurality of videos is greater than the preset quantity of times.

After whether the quantity of reporting times is greater than the preset quantity of times is judged, the ID of the target video is stored into the preset queue if it is judged that the quantity of reporting times is greater than the preset quantity of times, and the preset queue is used to store an ID of a highly frequently played video. To be specific, the preset queue is a precedence analysis queue, and the highly frequently played video is a video whose quantity of reporting times is greater than the preset quantity of times.

In this embodiment, the quantity of reporting times of the ID of the target video is obtained after the second structural body is updated to the first structural body; whether the quantity of reporting times is greater than the preset quantity of times is judged; and the ID of the target video is stored into the preset queue if it is judged that the quantity of reporting times is greater than the preset quantity of times, where the preset queue is used to store IDs of a plurality of videos, and a quantity of reporting times of each video of the plurality of videos is greater than the preset quantity of times, so as to store the ID of the target video into the preset queue, and then determine whether the target video is in a playable state and whether playback of the target video is invalidated.

In an optional implementation, after the ID of the target video is stored into the preset queue, the preset queue is traversed; query is performed on the reported information of the target video according to the ID of the target video in the preset queue, to obtain a query result; and a state of the target video is determined according to the query result.

Figure 7:
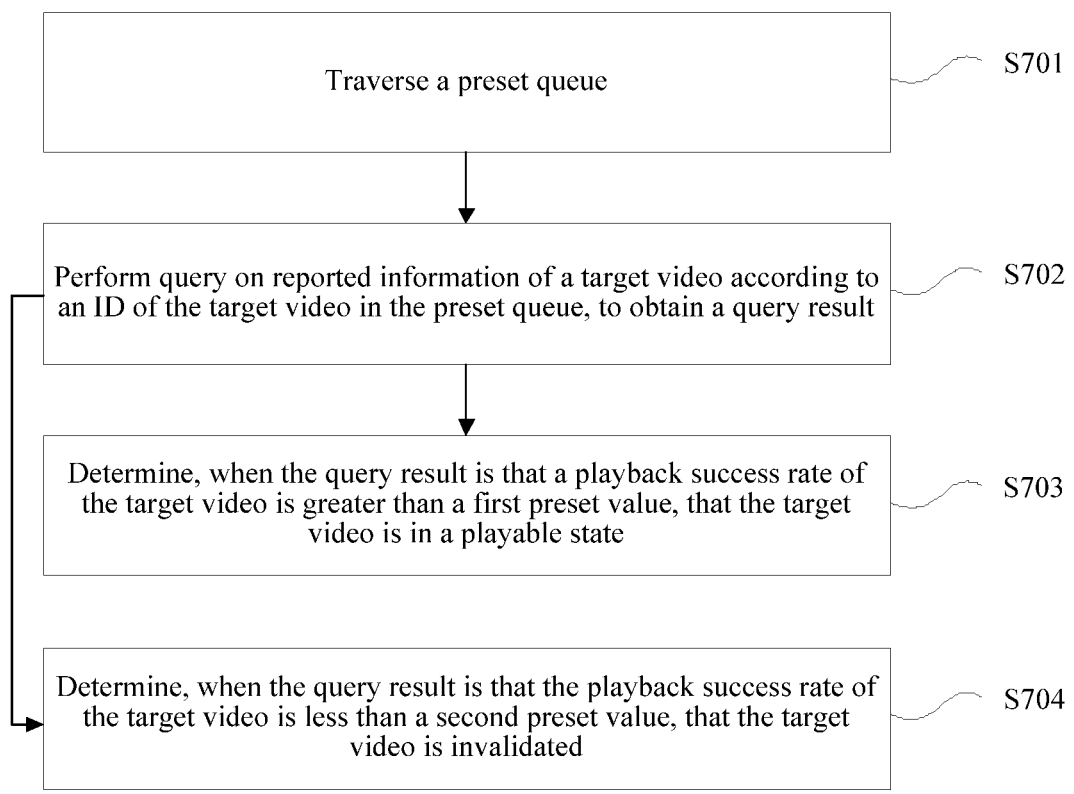
FIG. 7 is a flowchart of another video surveillance method according to an embodiment of the present disclosure.

FIG. 7 is a flowchart of another video surveillance method according to an embodiment of the present disclosure. As shown in FIG. 7, the video surveillance method further includes the following steps:

Step S701. Traverse a preset queue.

In a technical solution provided in step S701 of the present disclosure, the preset queue is traversed.

After an ID of a target video is stored into the preset queue, the preset queue is summarized every particular time. In some embodiments, a server summarizes a precedence analysis queue in last 5 minutes every 5 minutes, and cyclically traverses the preset queue.

Step S702. Perform query on reported information of a target video according to an ID of the target video in the preset queue, to obtain a query result.

In a technical solution provided in step S702 of the present disclosure, query is performed on the reported information of the target video according to the ID of the target video in the preset queue, to obtain a query result, and the query result may be a playback success rate of the target video, and a result of comparing the playback success rate with a preset value.

Step S703. Determine, when the query result is that a playback success rate of the target video is greater than a first preset value, that the target video is in a playable state.

In a technical solution provided in step S703 of the present disclosure, it is determined, when the query result is that the playback success rate of the target video is greater than the first preset value, that the target video is in the playable state.

In some embodiments, the first preset value is 80%, and after query is performed on the reported information of the target video according to the ID of the target video in the preset queue, to obtain the query result, when the playback success rate of the target video is greater than 80%, it is determined that the target video is in the playable state.

Step S704. Determine, when the query result is that a playback success rate of the target video is less than a second preset value, that the target video is invalidated.

In a technical solution provided in step S704 of the present disclosure, it is determined, when the query result is that the playback success rate of the target video is less than the second preset value, that the target video is invalidated.

In some embodiments, the second preset value is 20%, and after query is performed on the reported information of the target video according to the ID of the target video in the preset queue, to obtain the query result, when the playback success rate of the target video is less than 20%, it is determined that the target video has been invalidated.

In this embodiment, after the ID of the target video is stored into the preset queue, the preset queue is traversed; query is performed on the reported information of the target video according to the ID of the target video in the preset queue, to obtain a query result; and it is determined, when the query result is that the playback success rate of the target video is greater than the first preset value, that the target video is in the playable state; or it is determined, when the query result is that the playback success rate of the target video is less than the second preset value, that the target video is invalidated, thereby improving video surveillance efficiency.

In an optional implementation, after it is determined that the target video is in the playable state, the ID of the target video is cleared from the preset queue.

After the query result is that the playback success rate of the target video is greater than the first preset value and it is determined that the target video is in the playable state, it is determined that the target video is secure, the ID of the target video is cleared from the preset queue, and the preset queue does not need to be analyzed or summarized in a next round, thereby reducing a video surveillance time, and further improving video surveillance efficiency.

In an optional implementation, after it is determined that the target video is invalidated, the ID of the target video is written to a preset list, and the ID of the target video is cleared from the preset queue, where the preset list is used to store an ID of a video on which offline processing is to be performed.

If the query result is that the playback success rate of the target video is less than the second preset value and it is determined that the target video is invalidated, the ID of the target video is written to the preset list, and the preset list stores the ID of the video on which offline processing is to be performed. To be specific, offline processing is performed on the invalidated target video, the ID of the target video is cleared from the preset list, and the preset list does not need to be analyzed or summarized in a next round, thereby reducing a video surveillance time, and further improving video surveillance efficiency.

In an optional implementation, after query is performed on the reported information of the target video according to the ID of the target video, to obtain the query result, the ID of the target video is retained in the preset queue when the query result is that a playback success rate of the target video is between the second preset value and the first preset value.

For example, after query is performed on the reported information of the target video according to the ID of the target video, to obtain the query result, when the success rate of the target video is between 20% and 80%, the ID of the target video is retained to enter a next round of continuous surveillance.

In an optional implementation, a first structural body includes at least one of the following: video number information; video type information; video source information; a quantity of successful playback times; a quantity of unsuccessful playback times; and a playback success rate.

A video surveillance method according to an embodiment of the present disclosure is described below from a side of a client.

Figure 8:
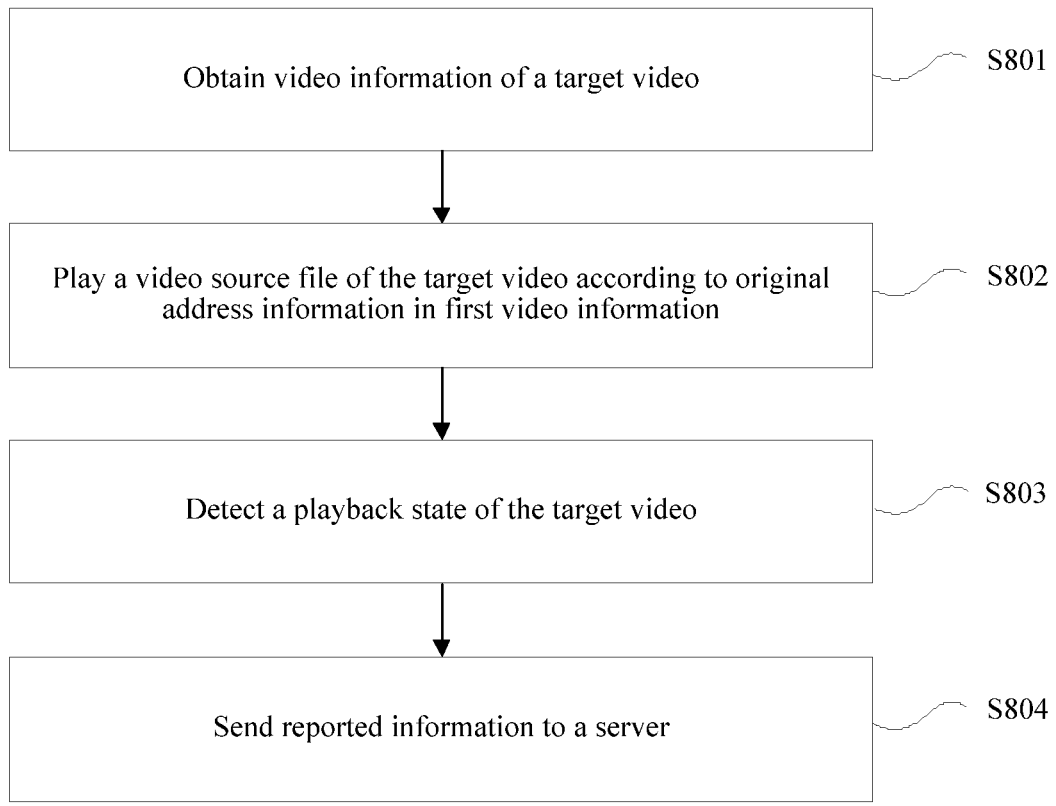
FIG. 8 is a flowchart of another video surveillance method according to an embodiment of the present disclosure.

FIG. 8 is a flowchart of another video surveillance method according to an embodiment of the present disclosure. As shown in FIG. 8, the video surveillance method may include the following steps:

Step S801. Obtain video information of a target video.

In a technical solution provided in step S801 of the present disclosure, the target video is played by an aggregate video website.

The target video in this embodiment is played by the aggregate video website, and includes a plurality of frames of video data. The client accesses the aggregate video website, sends, to a server, a request used to request the video data of the target video, and opens a video detail page of the target video. In this case, the client obtains first video information delivered by the server, where the client may be a browser. In some embodiments, the first video information includes basic information of the target video, a timeout waiting time, a playback address of the target video, and an alternate address of the target video, where the alternate address of the target video is another trusted link address for playing a source file of the target video when a video source file provided by a CP of the target video is invalidated, thereby switching the invalidated video source file.

Step S802. Play a video source file of the target video according to original address information in first video information.

In a technical solution provided in step S802 of the present disclosure, the first video information includes the original address information, and the original address information is address information of the target video on the CP. The client may obtain the original address information of the target video from the server by using the HTTP protocol, perform loading, and wait for playback.

After obtaining the first video information of the target video, the client establishes a video tag according to the original address information, and establishes a first time stamp, where the first time stamp is used to identify a time at which the first video information of the target video is obtained. The client obtains the video source file of the target video according to the original address information in the first video information, and plays the video source file, where the video source file may be provided by the CP.

Step S803. Detect a playback state of the target video.

In a technical solution provided in step S803 of the present disclosure, after the video source file of the target video is played according to the original address information in the first video information, the playback state of the target video is detected. If the target video begins to be played, the video tag triggers a first preset event, and the first preset event may be an event used to indicate that the playback state of the target video is a successful playback state. For example, the first preset event is used to indicate that the target video begins to be played.

When the first preset event is triggered, a second time stamp is established, and the second time stamp is used to identify a time at which the target video begins to be played, where a time difference between the second time stamp and the first time stamp is a first-frame consumed time of current playback of the target video. When the first preset event is triggered, a playback time of the target video is monitored. To be specific, a playback progress of the target video is monitored. When it is found that the playback progress of the target video is greater than a preset time, it is determined that the target video is successfully played when the video source file of the target video is played according to the original address information in the first video information.

In some embodiments, when the playback state of the target video is detected, if it is detected that playback of the target video has an error, for example, it is detected that no video frame in the target video is successfully played, the video tag triggers a second preset event. The second preset event may be an event used to indicate that the playback state of the target video is an unsuccessful playback state. For example, the second preset event is used to indicate that playback of the target video has an error. When the second preset event is triggered, a third time stamp is established, and the third time stamp is used to identify a time at which playback of the target video has an error, where a time difference between the third time stamp and the first time stamp is a consumed time of unsuccessful playback of the target video.

In some embodiments, when the playback state of the target video is detected, if it is detected that the target video is not played immediately and does not have an error either, the client continuously waits until the first preset event is triggered or the second preset event is triggered, or waits for the timeout waiting time, where the timeout waiting time is delivered by the server, and is one type of information in the first video information.

Step S804. Send reported information to a server.

In a technical solution provided in step S804 of the present disclosure, the reported information includes information used to indicate the playback state.

After detecting the playback state of the target video, the client reports the current playback process of the target video by using the reported information, where the reported information includes information used to indicate the playback state of the target video. In some embodiments, in addition to the information used to indicate the playback state of the target video, the reported information further includes an IP of the client used to play the target video, a user identity used to log in to the client, and information such as the ID of the played target video, a playback source address, a playback source number, a first-frame consumed time of playback of the target video, and a network state.

After receiving the reported information sent by the client, the server establishes a three-dimensional table, and the three-dimensional table may be used to store a first-frame consumed time of playback of the target video. The server summarizes the three-dimensional table of the preset event every preset time, for example, summarizes an average value of first-frame consumed times stored in the three-dimensional table, and then obtains, during video playback, the timeout waiting time used to judge whether playback of a video times out. When sending a next request, the client delivers the second video information including the timeout waiting time. The server establishes structural body information according to the ID of the target video in the reported information. In some embodiments, if structural body information corresponding to the ID of the target video has existed, the structural body information is updated by using the currently established structural body information. In some embodiments, if a quantity of times of reporting the ID of the target video in one round is greater than a preset quantity of times, the video is placed into a precedence analysis queue. In each round, the server summarizes the precedence analysis queue, determines whether the target video is normally played and whether the target video is invalidated, and then takes different processing manners for the normally played video and the invalidated video, thereby improving video surveillance efficiency.

By using the foregoing solution, the invalidated video may be passively detected every preset time and offline processing is performed on the invalidated video. Then, active scanning is performed with reference to a conventional solution, and more reliable guarantee may be provided for online user experience, to sense an invalidated video of the CP within a minute level and quickly take the invalidated video offline.

In this embodiment, the first video information of the target video is obtained, where the target video is played by the aggregate video website; the video source file of the target video is played according to the original address information in first video information; then the playback state of the target video is detected; the reported information that is used to indicate the playback state is sent to the server; and whether the target video is invalidated is quickly determined by using the server, thereby improving video surveillance efficiency, and further resolving the technical problem of low video surveillance efficiency in the related technology.

In an optional implementation, step S802 of playing a video source file of the target video according to original address information in first video information includes: inserting the video source file into a preset page according to the video tag established according to the original address information.

Figure 9:
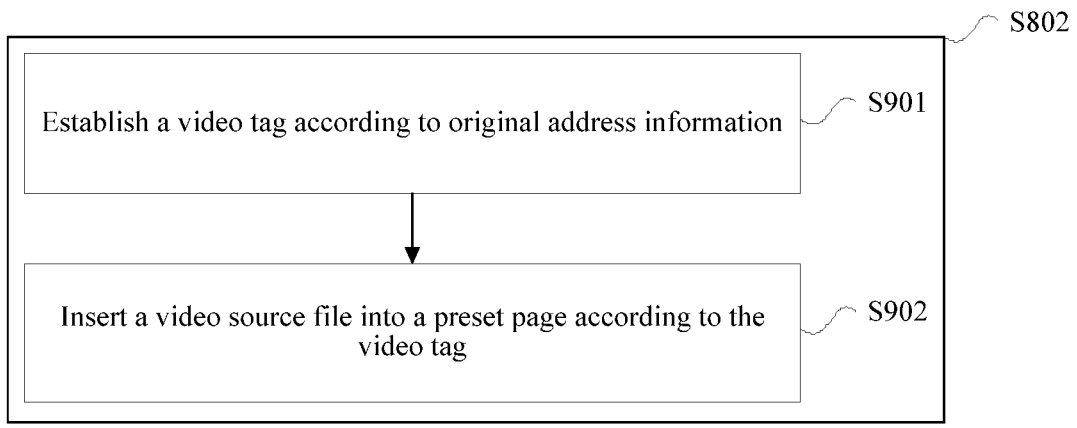
FIG. 9 is a flowchart of a method for playing a video source file of a target video according to original address information in first video information according to an embodiment of the present disclosure.

FIG. 9 is a flowchart of a method for playing a video source file of a target video according to original address information in first video information according to an embodiment of the present disclosure. As shown in FIG. 9, the method for playing a video source file of a target video according to original address information in first video information includes the following steps:

Step S901. Establish a video tag according to original address information.

In a technical solution provided in step S901 of the present disclosure, the video tag has an association relationship with a target video.

After first video information of the target video is obtained, the original address information in the first video information is obtained, and the video tag is established according to the original address information. The video tag has an association relationship with the target video, and may be a new tag in the HTML.

Step S902. Insert a video source file into a preset page according to the video tag.

In a technical solution provided in step S902 of the present disclosure, after the video tag is established according to the original address information, the video source file is inserted into the preset page according to the video tag. In some embodiments, the video tag is further used to insert a video element into an HTML page, to define a video, such as, a movie clip or another video stream, and also supports an event attribute in the HTML, to determine playback states of the target video by triggering different events, such as, a successful playback state of the target video and an unsuccessful playback state of the target video.

In this embodiment, the video tag is established according to the original address information, where the video tag has an association relationship with the target video; the video source file is inserted into the preset page according to the video tag, and the video source file of the target video is played according to the original address information in the first video information; and then the playback state of the target video is detected, and reported information used to indicate the playback state of the target video is sent to a server, thereby improving surveillance efficiency of the target video.

In an optional implementation, step S803 of detecting a playback state of the target video includes: if it is detected that the video tag triggers the first preset event, determining the playback state as successful playback of the target video; or if it is detected that the video tag triggers the second preset event, determining the playback state as unsuccessful playback of the target video.

Figure 10:
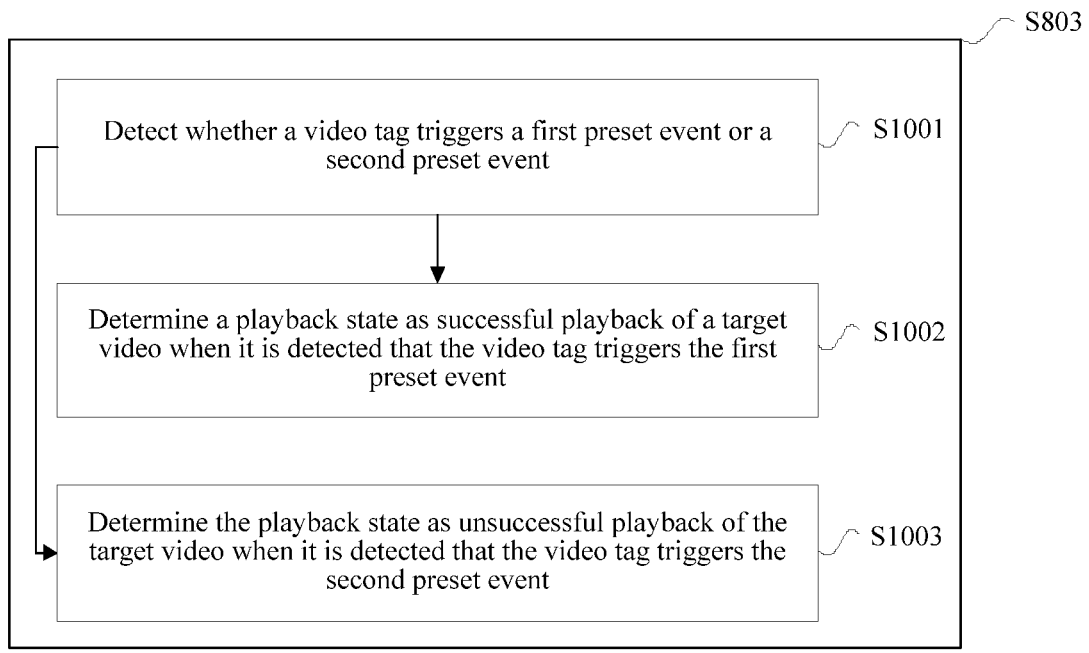
FIG. 10 is a flowchart of a method for detecting a playback state of a target video according to an embodiment of the present disclosure.

FIG. 10 is a flowchart of a method for detecting a playback state of a target video according to an embodiment of the present disclosure. As shown in FIG. 10, the method for detecting a playback state of a target video includes the following steps:

Step S1001. Detect whether a video tag triggers a first preset event or a second preset event.

In a technical solution provided in step S1001 of the present disclosure, after a video source file of a target video is played according to original address information in first video information, the target video may begin to be played, or playback of the target video may have an error. The first preset event is used to indicate that the target video begins to be played, and the second preset event is used to indicate that playback of the target video has an error. Whether the video tag triggers the first preset event or the second preset event is detected.

Step S1002. Determine a playback state as successful playback of the target video when it is detected that the video tag triggers the first preset event.

In a technical solution provided in step S1002 of the present disclosure, if the target video begins to be played, the video tag triggers the first preset event; and when it is detected that the first preset event is triggered, the playback state of the target video is determined as successful playback of the target video. In this case, a second time stamp is established, where the second time stamp is used to identify a time of successful playback of the target video. In some embodiments, a first time stamp is established when the video tag is established, where a time difference between the first time stamp and the second time stamp is a first-frame consumed time of the target video.

Step S1003. Determine the playback state as unsuccessful playback of the target video when it is detected that the video tag triggers the second preset event.

In a technical solution provided in step S1003 of the present disclosure, if playback of the target video has an error, for example, no video frame of the target video is successfully played, the video tag should trigger the second preset event; and when it is detected that the video tag triggers the second preset event, the playback state of the target video is determined as unsuccessful playback. In this case, a third time stamp is established, where the third time stamp is used to identify a time of unsuccessful playback of the target video, and a time difference between the third time stamp and the first time stamp is a consumed time of current unsuccessful playback of the target video.

In this embodiment, whether the video tag triggers the first preset event or the second preset event is detected; when it is detected that the video tag triggers the first preset event, the playback state is determined as successful playback of the target video; and when it is detected that the video tag triggers the second preset event, the playback state is determined as unsuccessful playback of the target video, so as to detect the playback state of the target video, determine a playable rate of the target video, and then quickly find jitter of an Internet data center/content delivery network (IDC/CDN), thereby improving surveillance efficiency of the target video.

In an optional implementation, after the playback state is determined as unsuccessful playback of the target video, the video source file stored on the CDN is obtained according to alternate address information in the first video information; and the target video is played according to the video source file stored on the CDN.

Figure 11:
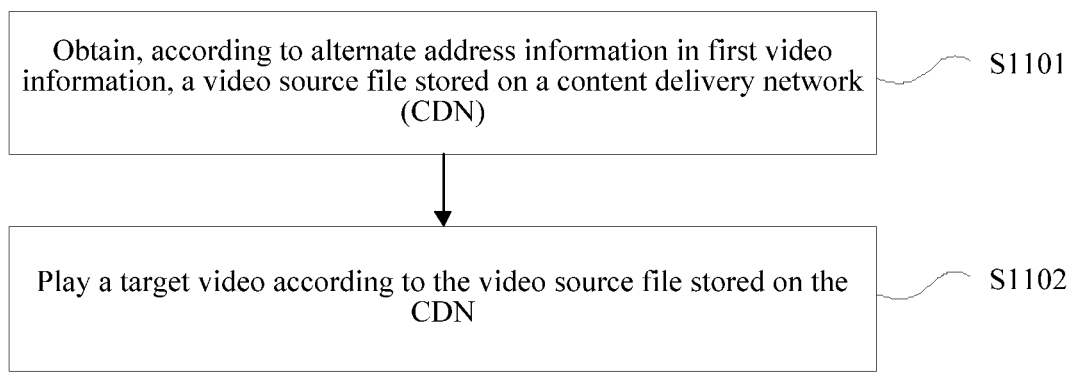
FIG. 11 is a flowchart of another video surveillance method according to an embodiment of the present disclosure.

FIG. 11 is a flowchart of another video surveillance method according to an embodiment of the present disclosure. As shown in FIG. 11, the video surveillance method further includes the following steps:

Step S1101. Obtain, according to alternate address information in first video information, a video source file stored on a CDN.

In a technical solution provided in step S1101 of the present disclosure, the alternate address information is address information of the video source file on the CDN.

When a client sends a request for requesting video data of a target video to a server, the server not only delivers basic information and a playback address of the target video, but also delivers the alternate address information. In some embodiments, the alternate address information is usually a link of the target video on a trusted CDN. An aggregate video website does not store or aggregate video source files of CPs, but instead when a user watches a target video, an original playback address of the target video on a CP is directly delivered, and a video source file of the CP is obtained by using the original playback address.

Preferably, a video source file of the target video is stored on the trusted CDN, and after the playback state is determined as unsuccessful playback of the target video, to be specific, when it is determined that the video source file of the CP cannot be played, the video source file stored on the CDN is obtained according to the alternate address information in the first video information.

Step S1102. Play a target video according to the video source file stored on the CDN.

In a technical solution provided in step S1102 of the present disclosure, after the video source file stored on the CDN is obtained according to the alternate address information in the first video information, the target video is played according to the video source file stored on the CDN by using downlink bandwidth of the CDN, so that when the playback state of the target video is determined as unsuccessful playback of the target video, the link on the trusted CDN is intelligently switched to ensure user experience.

In some embodiments, if the client can normally play the video source file, the client does not need to play the target video according to the video source file stored on the CDN, and does not need to use downlink bandwidth of the CDN of the client, thereby reducing video surveillance costs.

In this embodiment, after the playback state is determined as unsuccessful playback of the target video, the video source file stored on the CDN is obtained according to the alternate address information in the first video information, where the alternate address information is address information of the video source file on the CDN; and the target video is played according to the video source file stored on the CDN, so as to avoid a problem of deterioration of user experience caused because an error is immediately reported when the client unsuccessfully plays the target video after the server uniformly delivers unique original address information.

In an optional implementation, after whether a video tag triggers a preset event is detected, and when it is detected that the video tag triggers neither a first preset event nor a second preset event in a timeout waiting time, the playback state is determined as unsuccessful playback of the target video, where the first video information includes the timeout waiting time.

The first preset event is used to indicate that the playback state of the target video is a successful playback state, and the second preset event is used to indicate that the playback state of the target video is an unsuccessful playback state. When it is detected that the video tag triggers neither the first preset event nor the second preset event in the timeout waiting time, the playback state of the target video is determined as unsuccessful playback of the target video. In some embodiments, if the target video is not played immediately and does not have an error either, the client continuously waits until the first preset event is triggered or the second preset event is triggered, or waits for the timeout waiting time. If the first preset event or the second preset event is still not triggered when the timeout waiting time is reached, it is determined that playback of the target video is unsuccessful, where the first video information includes the timeout waiting time.

In some embodiments, when the target video is played, because a network environment is complex, when loading the video source file, the client may not immediately return the successful or unsuccessful playback state. To enable more users to possess optimal user experience, a waiting switching time may be optimized on the server side by establishing a three-dimensional table and a structural body for an ID of the target video.

In an optional implementation, step S1002 of determining a playback state as successful playback of the target video when it is detected that the video tag triggers the first preset event includes: monitoring a playback time of the target video when it is detected that the video tag triggers the first preset event; and determining the playback state as successful playback of the target video when the playback time of the target video is greater than a first preset time.

Figure 12:
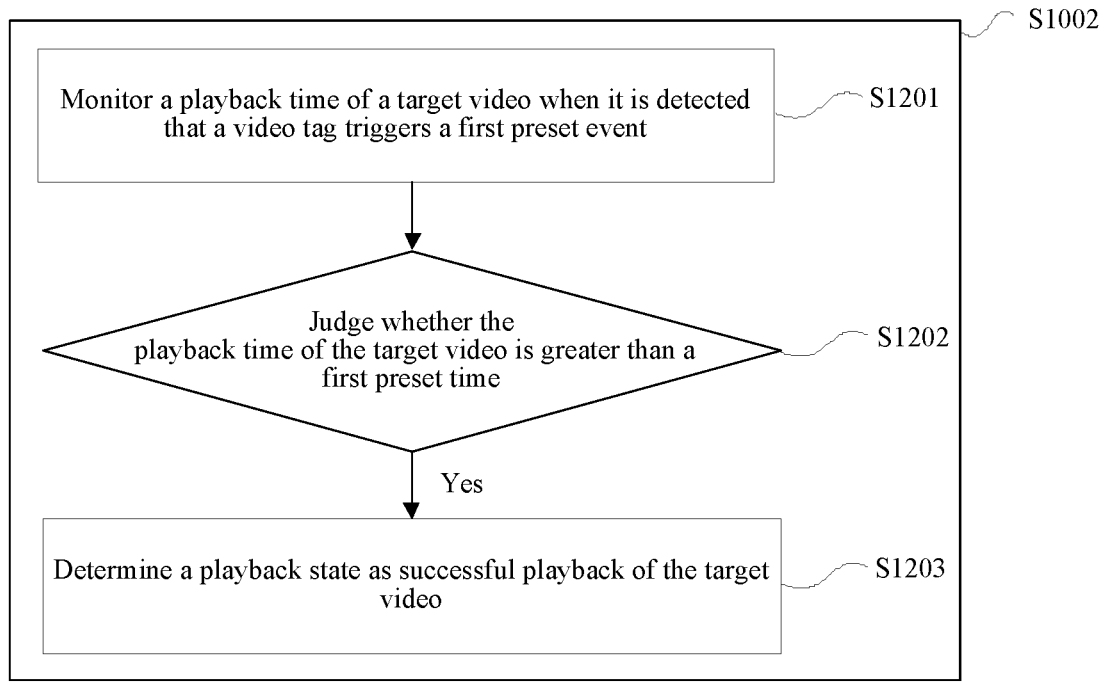
FIG. 12 is a flowchart of a method for determining a playback state as successful playback of a target video according to an embodiment of the present disclosure.

FIG. 12 is a flowchart of a method for determining a playback state as successful playback of a target video according to an embodiment of the present disclosure. As shown in FIG. 12, the method for determining a playback state as successful playback of a target video includes the following steps:

Step S1201. Monitor a playback time of a target video when it is detected that a video tag triggers a first preset event.

In a technical solution provided in step S1201 of the present disclosure, the first preset event is used to indicate that the target video begins to be played.

After whether the video tag triggers the first preset event or a second preset event is detected, the playback time of the target video begins to be monitored when it is detected that the video tag triggers the first preset event, and the playback time of the target video may be monitored by monitoring a playback progress of the target video.

Step S1202. Judge whether the playback time of the target video is greater than a first preset time.

In a technical solution provided in step S1202 of the present disclosure, after the playback time of the target video is monitored, whether the playback time of the target video is greater than the first preset time is judged, and if it is judged that the playback time of the target video is greater than the first preset time, step S1203 is performed.

In some embodiments, the first preset time is 1 second, and when it is judged that the playback time of the target video exceeds 1 second, step S1203 is performed.

Step S1203. Determine a playback state as successful playback of the target video.

In a technical solution provided in step S1203 of the present disclosure, the playback state is determined as successful playback of the target video if it is judged that the playback time of the target video is greater than the first preset time.

After whether the playback time of the target video is greater than the first preset time is judged, the playback state is determined as successful playback of the target video when the playback time of the target video is greater than the first preset time. In this case, that the target video is in a successful playback state is reported to a server.

In this embodiment, the playback time of the target video is monitored when it is detected that the video tag triggers the first preset event, where the first preset event is used to indicate that the target video begins to be played; whether the playback time of the target video is greater than the first preset time is judged; and the playback state is determined as successful playback of the target video if it is judged that the playback time of the target video is greater than the first preset time, so as to determine the playback state as successful playback of the target video when it is detected that the video tag triggers the first preset event, and further improve video surveillance efficiency.

In an optional implementation, step S1003 of determining the playback state as unsuccessful playback of the target video when it is detected that the video tag triggers the second preset event includes: determining the playback state as unsuccessful playback of the target video when the second preset event is used to indicate that playback of the target video has an error and it is detected that the video tag triggers the second preset event.

When playback of the target video has an error, for example, no video frame of the target video is successfully played, the video tag triggers the second preset event. When it is detected that the second preset event is triggered, it is determined that playback of the target video is unsuccessful. In this case, that the target video is in an unsuccessful playback state is reported to the server.

In an optional implementation, in addition to information used to indicate the playback state, reported information further includes at least one of the following: an IP of a client for playing the target video; identity information used to log in to a client; an ID of the target video; a source address of the target video; a source number of the target video; a first-frame playback time of the target video; and a network state for playing the target video.

A technical solution of the present disclosure is described below with reference to a preferred embodiment. In this embodiment, a video surveillance method is mainly described.

In this embodiment, a terminal device has a network access capability, a browser kernel has a compatible HTML5 JavaScript API, a background service may position a geographic location of a user by using an IP or a user identifier, and a station has a video aggregate capability.

Figure 13:
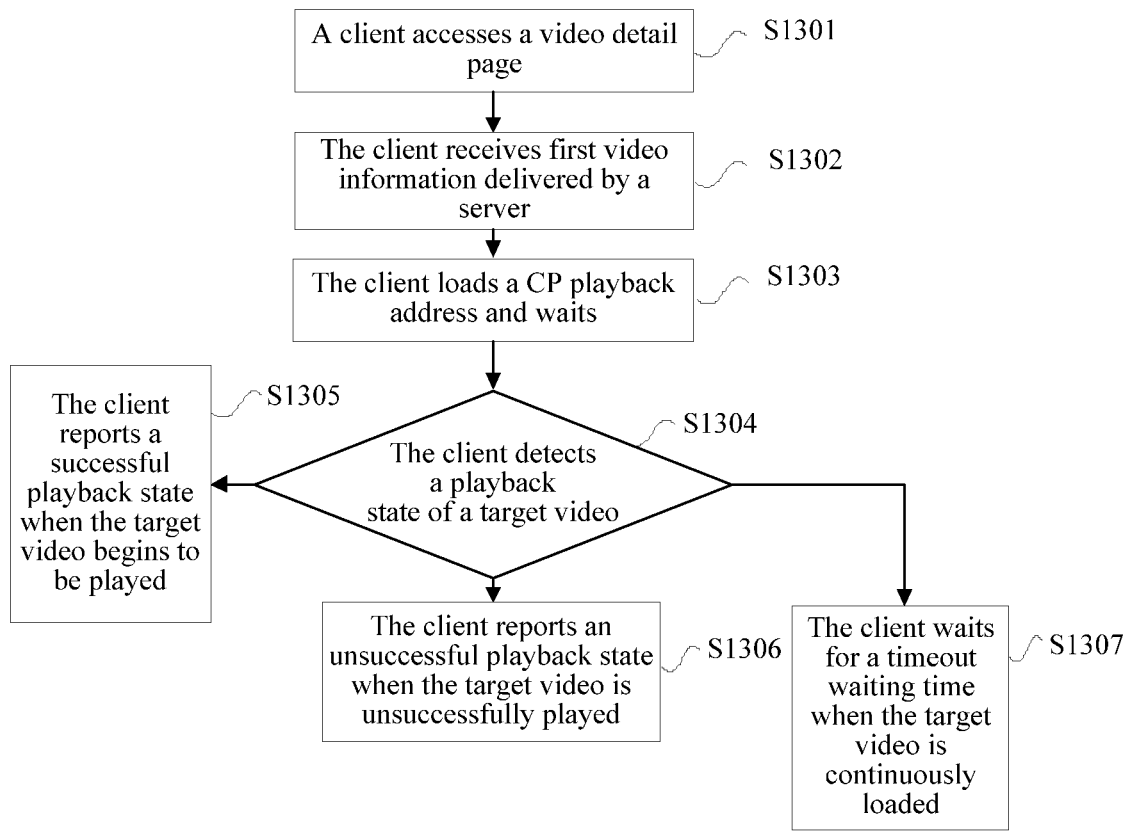
FIG. 13 is a flowchart of another video surveillance method according to an embodiment of the present disclosure.

FIG. 13 is a flowchart of another video surveillance method according to an embodiment of the present disclosure. As shown in FIG. 13, the video surveillance method includes the following steps:

Step S1301. A client accesses a video detail page.

A video aggregate WEB APP to which a target video belongs is accessed, and a video detail page is opened.

Step S1302. The client receives first video information delivered by a server.

A browser obtains first video information of a target video from a background by using the HTTP protocol, where the first video information includes a playback address of the target video.

Step S1303. The client loads a CP playback address, and waits.

A front end plays a video source file of the target video by using the playback address delivered by the background, establishes a video tag, and waits for the video tag to trigger an event.

Step S1304. The client detects a playback state of the target video.

Step S1305. When the target video begins to be played, the client reports a successful playback state.

If the target video begins to be played, the video tag should trigger an event X. When that the event X is triggered is received, a playback progress begins to be monitored. When the playback progress is greater than 1 second, it is determined that the target video is successfully played. In this case, the client sends, to the background, reported information including the successful playback state of the target video.

In some embodiments, the reported information may include: an IP of the client, a user identity (which is a GUID in the browser), an ID of a played video, a playback source address, a playback source number, and information indicating successful playback.

Step S1306. When the target video is unsuccessfully played, the client reports an unsuccessful playback state.

If playback of the target video has an error, for example, no video frame in the target video is successfully played, the video tag should trigger an event Y. When that the event Y is triggered is received, it is considered that the target video is unsuccessfully played. In this case, the client sends, to the background, reported information including the unsuccessful playback state of the target video.

In some embodiments, the reported information includes: an IP of the client, a user identity (which is a GUID in the browser), an ID of a played video, a playback source address, a playback source number, and information indicating unsuccessful playback.

Step S1307. When the target video is continuously loaded, the client waits for the timeout waiting time.

If the target video is not played immediately, and playback of the target video does not have an error either, the client continuously waits until the event X or Y is triggered, or waits for the timeout waiting time. If no event is still triggered when the timeout waiting time is reached, the client sends, to the background, reported information including the unsuccessful playback state of the target video.

In some embodiments, the reported information includes: an IP of the client, a user identity (which is a GUID in the browser), an ID of a played video, a playback source address, a playback source number, and information indicating unsuccessful playback.

Figure 14:
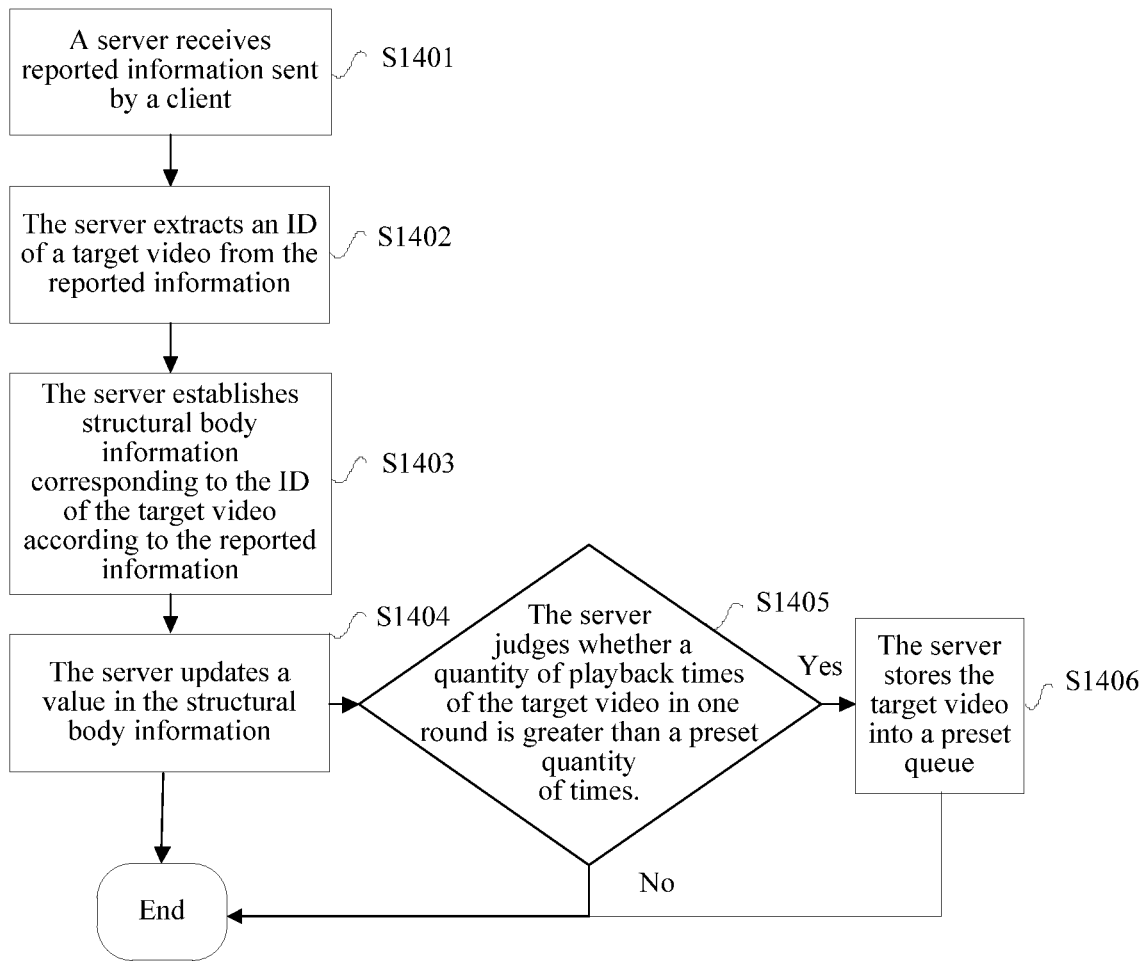
FIG. 14 is a flowchart of another video surveillance method according to an embodiment of the present disclosure.

FIG. 14 is a flowchart of another video surveillance method according to an embodiment of the present disclosure. As shown in FIG. 14, the video surveillance method includes the following steps:

Step S1401. A server receives reported information sent by a client.

Step S1402. The server extracts an ID of a target video from the reported information.

After receiving the reported information from the client, the server establishes a three-dimensional table, whose dimensions are respectively: a source number, a region, and a network type. The server extracts the ID of the target video from the reported information. A region (which may be accurate to a municipal level) in which a user is located is obtained through parsing by using an ID of the target video or a user identity.

Step S1403. The server establishes structural body information corresponding to the ID of the target video according to the reported information.

The server establishes the following structural body information for a reported video ID.

TABLE 1

Structural body information of the target video

| Field name | Field type |
| --- | --- |
| Video number | Numeric |
| Video type | Numeric |
| Video source | Numeric |
| Quantity of successful playback times | Numeric |
| Field name | Field type |
| Quantity of unsuccessful playback times | Numeric |
| Success rate | Floating-point |

The structural body information of the target video includes a video number of the target video, a video type, a video source, a quantity of successful playback times of the target video, a quantity of unsuccessful playback times, and a success rate. Field types corresponding to the video number, the video type, and the video source of the target video, and the quantity of successful playback times and the quantity of unsuccessful playback times of the target video are numeric types, and a field type corresponding to the success rate of the target video is a floating-point type.

Step S1404. The server updates a value in the structural body information.

If structural body information corresponding to the ID of the target video has existed, the structural body information is updated by using the currently obtained structural body information.

Step S1405. The server judges whether a quantity of playback times of the target video in one round is greater than a preset quantity of times.

If the server judges that the quantity of playback times of the target video in one round is greater than the preset quantity of times, step S1406 is performed; or if the server judges that the quantity of playback times of the target video in one round is not greater than the preset quantity of times, the process ends.

The server judges whether the quantity of playback times of the target video in one round is greater than the preset quantity of times. In some embodiments, the server judges whether a quantity of times of reporting the ID of the target video in one round (one round lasts for 5 minutes) is greater than 200. If the server judges that the quantity of playback times of the target video in one round is greater than the preset quantity of times, step S1406 is performed.

Step S1406. The server stores the target video into a preset queue.

After the server judges whether the quantity of playback times of the target video in one round is greater than the preset quantity of times, if the server judges that the quantity of playback times of the target video in one round is greater than the preset quantity of times, the server stores the target video into the preset queue. If it is determined that this target video is a highly frequently played video, this video is placed into a precedence analysis queue.

Figure 15:
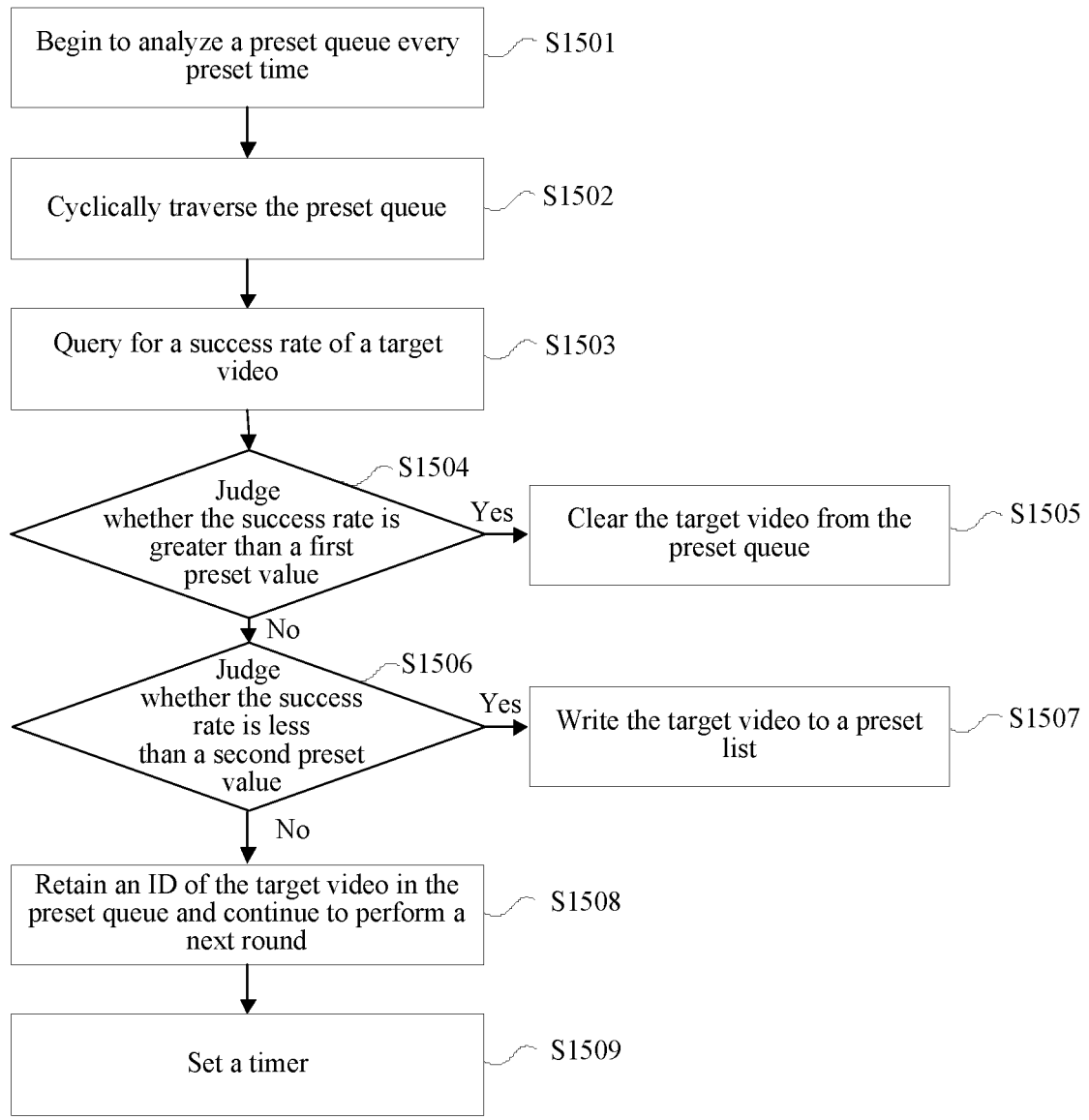
FIG. 15 is a flowchart of another video surveillance method according to an embodiment of the present disclosure.

FIG. 15 is a flowchart of another video surveillance method according to an embodiment of the present disclosure. As shown in FIG. 15, the video surveillance method includes the following steps:

Step S1501. Begin to analyze a preset queue every preset time.

The preset time may be set to five minutes, and the preset queue is analyzed every five minutes.

Step S1502. Cyclically traverse the preset queue.

Step S1503. Query for a success rate of a target video.

Step S1504. Judge whether the success rate is greater than a first preset value.

If it is judged that the success rate is greater than the first preset value, step S1505 is performed. If it is judged that the success rate is not greater than the first preset value, step S1506 is performed. In some embodiments, when the success rate of the target video is greater than 80%, it is determined that the target video is playable.

Step S1505. Clear the target video from the preset queue.

After whether the success rate is greater than the first preset value is judged, if it is judged that the success rate is greater than the first preset value, the target video is cleared from the preset queue.

Step S1506. Judge whether the success rate is less than a second preset value.

After whether the success rate is greater than the first preset value is judged, if it is judged that the success rate is not greater than the first preset value, whether the success rate is less than the second preset value is judged. If it is judged that the success rate is less than the second preset value, step S1507 is performed. If it is judged that the success rate is not less than the second preset value, step S1508 is performed. In some embodiments, when the success rate of the target video is less than 20%, it is determined that the target video has been invalidated.

Step S1507. Write the target video to a preset list.

After whether the success rate is less than the second preset value is judged, if it is judged that the success rate is less than the second preset value, the target video is written to the preset list. For the invalidated video, a video ID is written to a video offline filtering table, to enter an offline process.

Step S1508. Retain an ID of the target video in the preset queue, and continue to perform a next round.

After whether the success rate is less than the second preset value is judged, if it is judged that the success rate is not less than the second preset value, the ID of the target video is retained in the preset queue, and a next round continues to be performed. In some embodiments, for a target video whose success rate is between 20% and 80%, data is retained to enter a next round for continuous observation.

Step S1509. Set a timer.

By using the foregoing solution, the invalidated video may be passively detected every preset time and offline processing is performed on the invalidated video. Then, more reliable guarantee may be provided for online user experience with reference to active scanning of the conventional solution 1, and an invalidated video of the CP may be sensed within a minute level and quickly taken offline.

For example, after a hot video application in a browser of a mobile terminal uses the technical solution, a speed of taking an invalidated video offline is reduced to 6 minutes from previous 20 minutes, thereby improving surveillance efficiency of the target video.

A technical solution of the present disclosure is described below with reference to another preferred embodiment. In this embodiment, a combination of a video surveillance method and a video switching method is mainly described.

Figure 16:
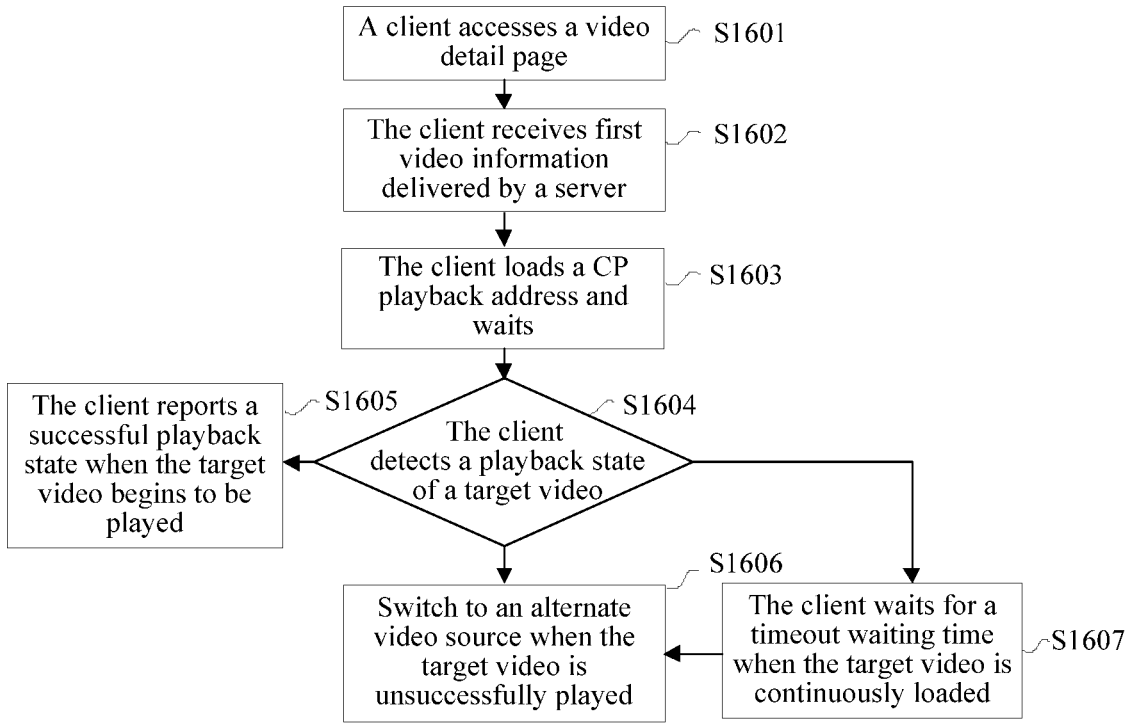
FIG. 16 is a flowchart of a video switching method according to an embodiment of the present disclosure.

FIG. 16 is a flowchart of a video switching method according to an embodiment of the present disclosure. As shown in FIG. 16, the video switching method includes the following steps:

Step S1601. A client accesses a video detail page.

A video aggregate WEB APP to which a target video belongs is accessed, and a detail page of the target video is opened. A browser obtains a playback address, an alternate address, and a timeout waiting time of a video from a background by using the HTTP protocol.

Step S1602. The client receives first video information delivered by a server.

Step S1603. The client loads a CP playback address, and waits.

A front end plays a video source file of the target video by using the playback address delivered by the background, establishes a video tag, waits for the video tag to trigger an event, and establishes a time stamp A.

Step S1604. The client detects a playback state of the target video.

Step S1605. When the target video begins to be played, the client reports a successful playback state.

If the target video begins to be played, the video tag should trigger an event X. When that the event X is triggered is received, a time stamp B is established, and a playback progress begins to be monitored. When the playback progress is greater than 1 second, it is determined that the target video is successfully played. In this case, the client sends, to the background, reported information including the successful playback state of the target video. In this case, B-A is a first-frame consumed time (which is marked as Ra) of the current playback.

Step S1606. When the target video is unsuccessfully played, switch to an alternate video source.

If playback of the target video has an error, for example, no video frame in the target video is successfully played, the video tag should trigger an event Y. When that the event Y is triggered is received, a time stamp C is established, and it is considered that the target video is unsuccessfully played. In this case, the client sends, to the background, reported information including the unsuccessful playback state of the target video. Moreover, switching to the alternate video source is performed, and this process is restarted. In this case, C-A is a consumed time (which is marked as Rb) for finding failure of the current playback. After the client reports an unsuccessful playback state, or the client waits for the timeout waiting time, switching to the alternate video source is performed.

Step S1607. When the target video is continuously loaded, the client waits for the timeout waiting time.

If the target video is not played immediately, and playback of the target video does not have an error either, the client continuously waits until the event X or Y is triggered, or waits for the timeout waiting time. If no event is still triggered when the timeout waiting time is reached, the client sends, to the background, reported information including the unsuccessful playback state of the target video, and step S1606 is performed.

The client reports information from a user about the current playback state of the target video, and the reported information includes: an IP of the client, a user identity (which is a GUID in the browser), an ID of a played video, a playback source address, a playback source number, whether playback is successful (when no event is triggered until the timeout waiting time, playback is considered as failure), a first-frame consumed time, a user network state, and the like.

Figure 17:
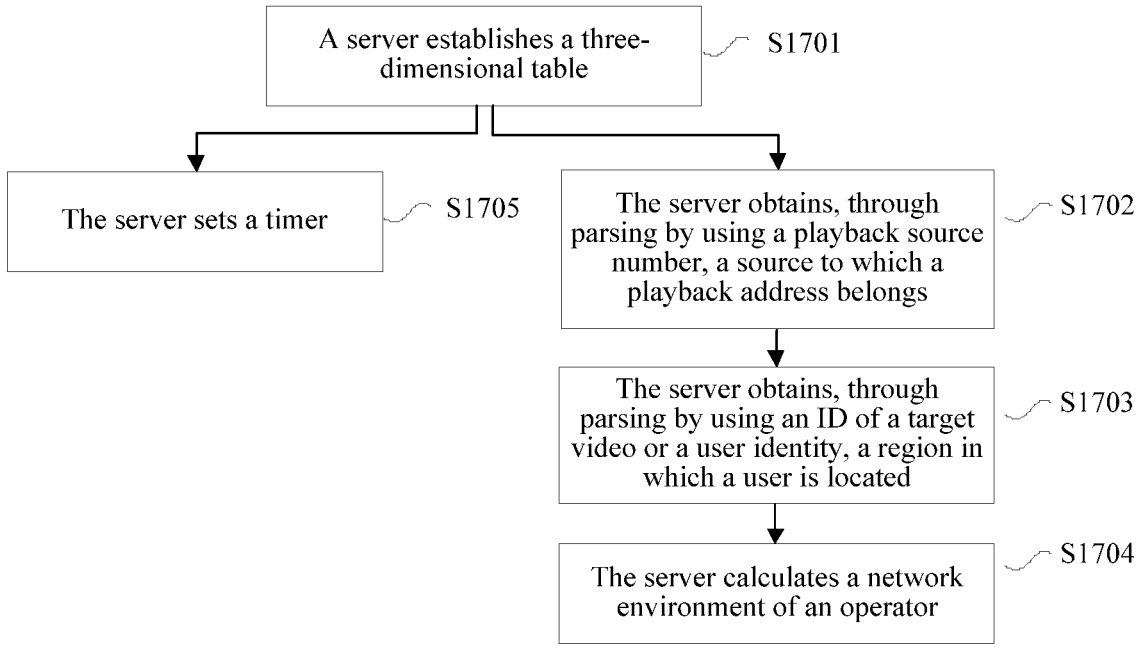
FIG. 17 is a flowchart of another video switching method according to an embodiment of the present disclosure.

FIG. 17 is a flowchart of another video switching method according to an embodiment of the present disclosure. As shown in FIG. 17, the video switching method includes the following steps:

Step S1701. A server establishes a three-dimensional table.

After receiving reported information from a user, the server establishes a three-dimensional table according to successful playback information that is screened out, and dimensions of the three-dimensional table are respectively: a source number, a region, and a network type.

Step S1702. The server obtains, through parsing by using a playback source number, a source to which a playback address belongs.

Step S1703. The server obtains, through parsing by using an ID of a target video or a user identity, a region in which a user is located.

Step S1704. The server calculates a network environment of an operator.

Step S1705. The server sets a timer.

The server is used to set a polling time for the three-dimensional table.

An execution process is described below in more details:

When a front end requests data of a video from a background, the background not only delivers basic information and a playback address of the video, but also delivers an alternate address, and this address is usually a link of the video on a trusted CDN. The reason why design is performed in this way is usually that, the aggregate video website does not store or aggregate video source files of the CPs (copyright, storage, and bandwidth costs), but instead when the user watches a video, an original playback address of the video on a CP is directly delivered.

However, in consideration of improving user experience, a better solution of the aggregate video website is to store a video source file on a trusted CDN of the aggregate video website. In consideration of costs, if a user may normally play a source file of a CP, the aggregate video website does not need to actually use downlink bandwidth of the CDN of the aggregate video website. However, when the source file of the CP is invalidated (cannot be played), the aggregate video website may intelligently switch to the trusted CDN to ensure user experience.

In consideration of a complex network environment, when loading the source file of the CP, the user may not be capable of immediately returning success or failure (this is usually related to a validation mechanism of the CP). To enable more users to have optimal user experience, a switching waiting time is optimized particularly in this solution.

Figure 18:
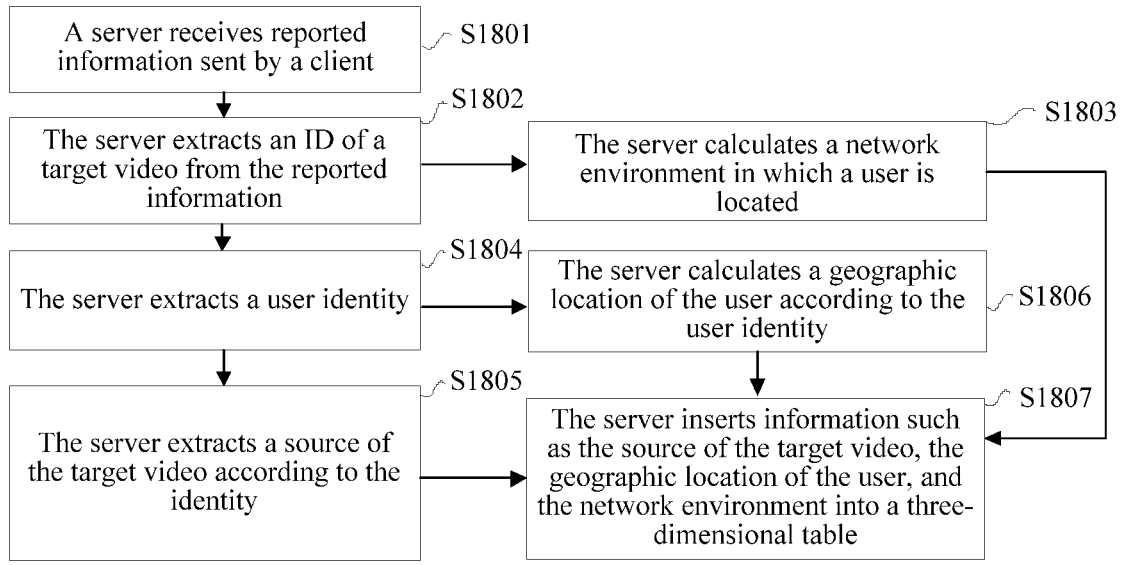
FIG. 18 is a flowchart of a method for inserting, by a server, information into a three-dimensional table according to an embodiment of the present disclosure.

FIG. 18 is a flowchart of a method for inserting, by a server, information into a three-dimensional table according to an embodiment of the present disclosure. As shown in FIG. 18, the method includes the following steps:

Step S1801. A server receives reported information sent by a client.

Step S1802. The server extracts an ID of a target video from the reported information.

Step S1803. The server calculates a network environment in which a user is located.

After the server extracts the ID of the target video from the reported information, the server calculates the network environment in which the user is located.

Step S1804. The server extracts a user identity.

After the server extracts the ID of the target video from the reported information, the server extracts the user identity.

Step S1805. The server extracts a source of the target video according to the identity.

After the server extracts the user identity, the server extracts the source of the target video according to the identity.

Step S1806. The server calculates a geographic location of the user according to the user identity.

After the server extracts the user identity, the server calculates the geographic location of the user according to the user identity.

Step S1807. The server inserts information such as the source of the target video, the geographic location of the user, and the network environment into a three-dimensional table.

After the server calculates the network environment in which the user is located, or the server extracts the source of the target video according to the identity, or the server calculates the geographic location of the user according to the user identity, the server inserts the information such as the source of the target video, the geographic location of the user and the network environment into the three-dimensional table.

Figure 19:
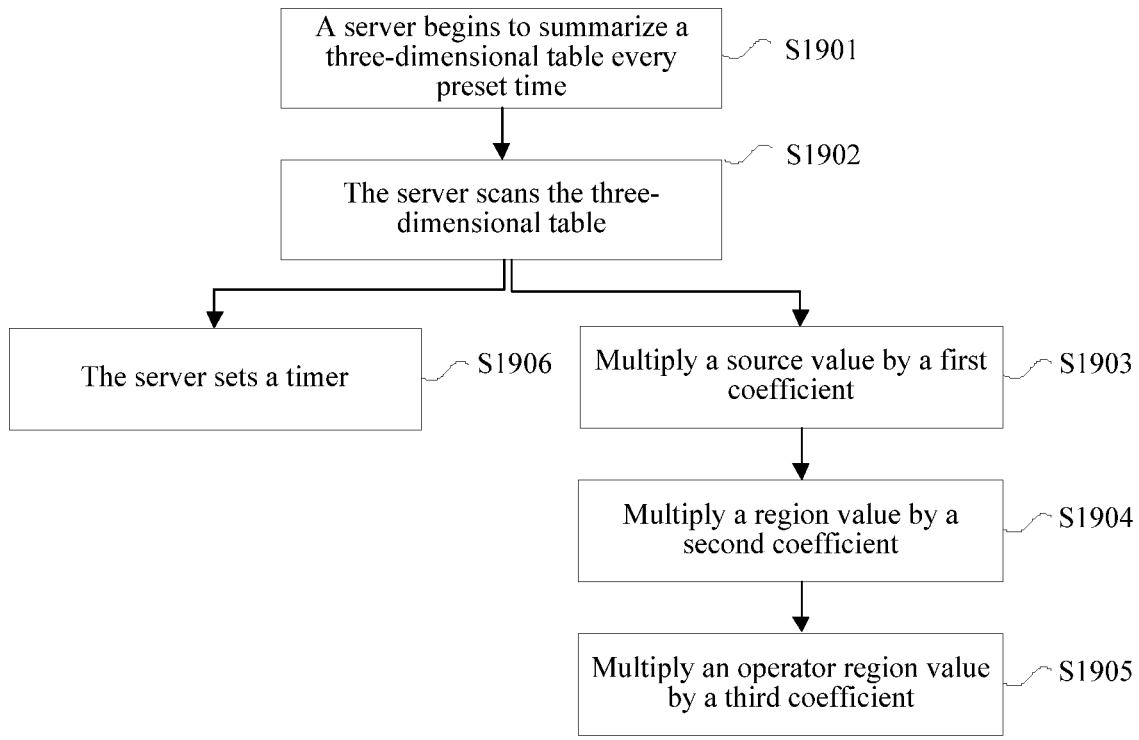
FIG. 19 is a flowchart of another video switching method according to an embodiment of the present disclosure.

FIG. 19 is a flowchart of another video switching method according to an embodiment of the present disclosure. As shown in FIG. 19, the video switching method includes the following steps:

Step S1901. A server begins to summarize a three-dimensional table every preset time.

Step S1902. The server scans the three-dimensional table.

Step S1903. Multiply a source value by a first coefficient.

After the three-dimensional table is scanned, the source value is multiplied by the first coefficient. In some embodiments, if the first coefficient is 1.2, the source value is multiplied by 1.2.

Step S1904. Multiply a region value by a second coefficient.

In some embodiments, if the second coefficient is 1.2, the region value is multiplied by 1.2.

Step S1905. Multiply an operator region value by a third coefficient.

In some embodiments, if the third coefficient is 1.2, the operator region value is multiplied by 1.2.

Step S1906. The server sets a timer.

After the three-dimensional table is scanned, the server may be set to summarize the three-dimensional table every 5 minutes.

In this embodiment, the source value in the three-dimensional table is multiplied by the first coefficient, the region value is multiplied by the second coefficient, and the operator region value is multiplied by the third coefficient, so as to dynamically analyze the target video, more flexibly perform surveillance on the target video, and improve surveillance efficiency of the target video.

Figure 20:
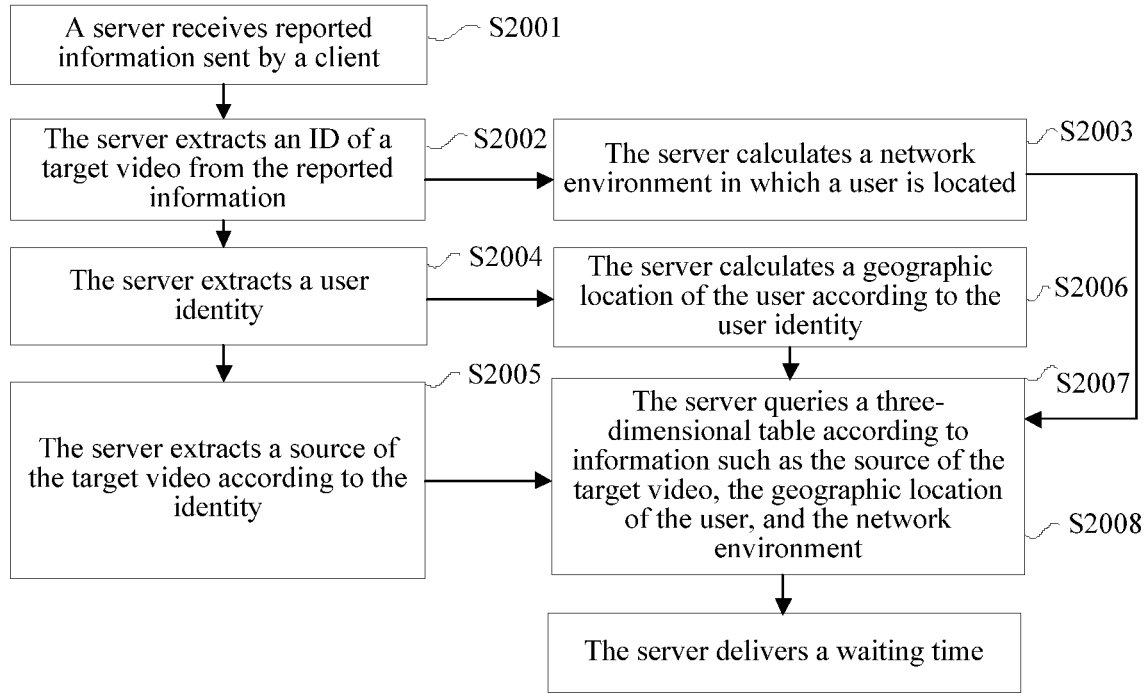
FIG. 20 is a flowchart of a method for delivering, by a server, a timeout waiting time according to an embodiment of the present disclosure.

FIG. 20 is a flowchart of a method for delivering, by a server, a timeout waiting time according to an embodiment of the present disclosure. As shown in FIG. 20, the method includes the following steps:

Step S2001. A server receives reported information sent by a client.

Step S2002. The server extracts an ID of a target video from the reported information.

Step S2003. The server calculates a network environment in which a user is located.

After the server extracts the ID of the target video from the reported information, the server calculates the network environment in which the user is located.

Step S2004. The server extracts a user identity.

After the server extracts the ID of the target video from the reported information, the server extracts the user identity.

Step S2005. The server extracts a source of the target video according to the identity.

After the server extracts the user identity, the server extracts the source of the target video according to the identity.

Step S2006. The server calculates a geographic location of the user according to the user identity.

After the server extracts the user identity, the server calculates the geographic location of the user according to the user identity.

Step S2007. The server queries a three-dimensional table according to information such as the source of the target video, the geographic location of the user, and the network environment.

After the server calculates the network environment in which the user is located, or the server extracts the source of the target video according to the identity, or the server calculates the geographic location of the user according to the user identity, the server queries the three-dimensional table according to the information such as the source of the target video, the geographic location of the user, and the network environment.

Step S2008. The server delivers a waiting time.

For example, a consumed time currently reported by the user is placed in a multi-dimensional table. For example, a user in Shenzhen (which has a region number 92) plays an iQIYI video (which has a source number 3) in an environment of a telecommunications network (which has a network type number 1), and a first-frame consumed time is 2 seconds. Therefore, a value 2 should be placed at a location of 3 on an axis X, 92 on an axis Y, and 1 on an axis Z. If a value has existed at the location, an average value is obtained by averaging the existing value and the newly placed value.

Every 5 minutes, the background summarizes the three-dimensional table in the last 5 minutes, and the summarization solution is to multiply the average value by 1.2, to obtain a new timeout waiting time of an operator for a source in a region, and deliver the new timeout waiting time when a next front end performs a request. Therefore, the client monitors the playback state of the target video in a next round according to the new timeout waiting time, and if the playback state of the target video is that playback has an error or the target video is not immediately played and does not have an error either, and no event is triggered until the timeout waiting time, it is determined that the playback state of the target video is unsuccessful playback, and the video is played by switching to an alternate video source.

In this embodiment, by using a capability of a terminal, a time of video playback/switching to an alternate source may be advanced to a page loading completion time from a start time at which a user clicks to play a video, and a first-frame consumed time of video playback may be further reduced. Moreover, a definition of reporting for the first-frame consumed time needs to be adjusted, to avoid a disadvantage that the background uniformly delivers a unique CP source address, and an error occurs immediately when the user cannot play the video, to deteriorate user experience.

This embodiment provides a more advanced solution for intelligently switching and playing a video source, to improve a video playable rate of the aggregate video website and quickly find IDC/CDN jitter, and can improve playback experience of the user, thereby reducing operating costs of the aggregate video website.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that the embodiments described in this specification all belong to exemplary embodiments, and the involved actions and modules are not necessarily mandatory to the present disclosure.

Through the descriptions of the preceding embodiments, persons skilled in the art may understand that the methods according to the foregoing embodiments may be implemented by hardware only or by software and a necessary universal hardware platform. However, in most cases, using software and a necessary universal hardware platform are preferred. Based on such understandings, all or part of the technical solutions under the present disclosure that makes contributions to the existing technology may be essentially embodied in the form of a software product. The software product may be stored in a storage medium (such as a ROM/RAM, a magnetic disk, or an optical disc). The software product includes a number of instructions that enable a terminal device (mobile phone, computer, server, or network device) to execute the method provided in each embodiment of the present disclosure.

Figure 21:
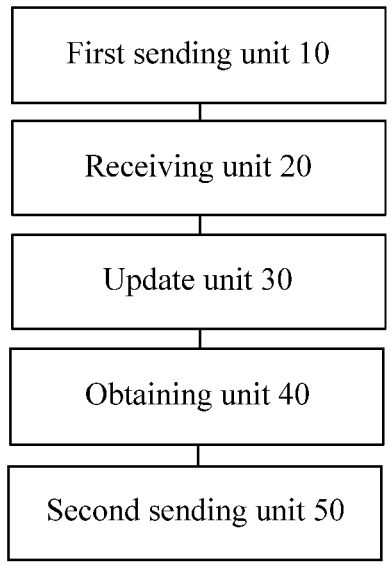
FIG. 21 is a schematic diagram of a video surveillance apparatus according to an embodiment of the present disclosure.

According to another aspect of the embodiments of the present disclosure, a video surveillance apparatus for implementing the foregoing video surveillance method is further provided. FIG. 21 is a schematic diagram of a video surveillance apparatus according to an embodiment of the present disclosure. As shown in FIG. 21, the video surveillance apparatus may include: a first sending unit 10, a receiving unit 20, an update unit 30, an obtaining unit 40 and a second sending unit 50.

The first sending unit 10 is configured to send first video information of a target video to a first client in response to a first request, where the target video is played by an aggregate video website.

The receiving unit 20 is configured to receive reported information that is used to indicate a playback state of the target video and that is sent by the first client, where the reported information is obtained by playing, by the first client, a video source file of the target video according to original address information in the first video information.

The update unit 30 is configured to update a first-frame playback time stored on a first location in a multi-dimensional table according to a first first-frame playback time in the reported information, where dimensions in the multi-dimensional table are respectively used to indicate different pieces of playback information of a video, and the first location is determined according to the reported information.

The obtaining unit is configured to obtain, according to the first-frame playback time, a timeout waiting time in second video information sent to a second client.

The second sending unit 50 is configured to send the second video information to the second client in response to a second request, where when the second client does not play the target video in the timeout waiting time, the playback state of the target video is determined as unsuccessful playback.

It should be noted herein that, the first sending unit 10, the receiving unit 20, the update unit 30, the obtaining unit 40, and the second sending unit 50 may be run in a terminal as a part of the apparatus, functions implemented by the foregoing units may be performed by using a processor in the terminal, and the terminal may also be a terminal device such as a smartphone (for example, an Android mobile phone or an iOS mobile phone), a tablet computer, a palmtop computer, a mobile Internet device (MID), or a PAD.

It should be noted that, the first sending unit 10 in this embodiment may be configured to perform step S202 in the embodiments of this application, the receiving unit 20 in this embodiment may be configured to perform step S204 in the embodiments of this application, the update unit 30 in this embodiment may be configured to perform step S206 in the embodiments of this application, the obtaining unit 40 in this embodiment may be configured to perform step S208 in the embodiments of this application, and the second sending unit 50 in this embodiment may be configured to perform step 5210 in the embodiments of this application.

The first sending unit 10 includes: a sending module, configured to send the first video information including alternate address information to the first client in response to the first request, where the alternate address information is address information of the video source file on a CDN, so that when the playback state is unsuccessful playback of the target video, the first client plays the target video according to the video source file stored on the CDN.

It should be noted herein that, the sending module may be run in the terminal as a part of the apparatus, and a function implemented by the foregoing module may be performed by using the processor in the terminal.

In some embodiments, the update unit 30 includes: an obtaining module, a determining module, and an update module. The obtaining module is configured to obtain, according to the reported information, a first playback region to which the first client belongs; the determining module is configured to determine the first location in the multi-dimensional table according to a first source number of the target video, the first playback region, and a first network type of the target video, where the video information includes the first source number and the first network type, and dimensions in the multi-dimensional table are respectively used to indicate a source number of a video, a playback region, and a network type; and the update module is configured to update the first-frame playback time stored on the first location according to the first first-frame playback time in the reported information.

It should be noted herein that, the obtaining module, the determining module and the update module may be run in the terminal as a part of the apparatus, and functions implemented by the foregoing modules may be performed by using the processor in the terminal.

In some embodiments, the update module includes: a judging sub-module, an obtaining sub-module, and an update sub-module. The judging sub-module is configured to judge whether a second first-frame playback time is stored on the first location; the obtaining sub-module is configured to obtain an average playback time of the first first-frame playback time and the second first-frame playback time if it is judged that the second first-frame playback time is stored on the first location; and the update sub-module is configured to update the second first-frame playback time to the average playback time.

It should be noted herein that, the judging sub-module, the obtaining sub-module, and the update sub-module may be run in the terminal as a part of the apparatus, and functions implemented by the foregoing modules may be performed by using the processor in the terminal.

In some embodiments, the obtaining unit 40 includes a summarization module, configured to summarize, according to a preset parameter every preset time, the first-frame playback time stored on the first location, to obtain the timeout waiting time, where the first-frame playback time is updated with the first video information sent by the first client at different times.

It should be noted herein that, the summarization module may be run in the terminal as a part of the apparatus, and a function implemented by the foregoing module may be performed by using the processor in the terminal.

In some embodiments, the apparatus further includes an establishment unit, configured to establish a first structural body corresponding to an ID of the target video according to the reported information after the reported information that is used to indicate the playback state of the target video and that is sent by the first client is received, where the reported information includes the ID of the target video, and the first structural body is used to indicate the reported information by using a preset field.

It should be noted herein that, the establishment unit may be run in the terminal as a part of the apparatus, and a function implemented by the foregoing unit may be performed by using the processor in the terminal.

In some embodiments, the establishment unit includes: a judging module and an update module. The judging module is configured to judge whether a second structural body corresponding to the ID of the target video exists; and the update module is configured to update the second structural body to the first structural body when it is judged that the second structural body corresponding to the ID of the target video exists.

It should be noted herein that, the judging module and the update module may be run in the terminal as a part of the apparatus, and functions implemented by the foregoing modules may be performed by using the processor in the terminal.

In some embodiments, the apparatus further includes: a first obtaining unit, a judging unit, and a storage unit. The first obtaining unit is configured to obtain a quantity of reporting times of the ID of the target video after the second structural body is updated to the first structural body; the judging unit is configured to judge whether the quantity of reporting times is greater than a preset quantity of times; and the storage unit is configured to store the ID of the target video into a preset queue if it is judged that the quantity of reporting times is greater than the preset quantity of times, where the preset queue is used to store IDs of a plurality of videos, and a quantity of reporting times of each video of the plurality of videos is greater than the preset quantity of times.

It should be noted herein that, the first obtaining unit, the judging unit and the storage unit may be run in the terminal as a part of the apparatus, and functions implemented by the foregoing units may be performed by using the processor in the terminal.

In some embodiments, the apparatus further includes: a traversing unit, a query unit, a first determining unit and a second determining unit. The traversing unit is configured to traverse the preset queue after the ID of the target video is stored into the preset queue; the query unit is configured to perform query on the reported information of the target video according to the ID of the target video in the preset queue, to obtain a query result; the first determining unit is configured to determine, when the query result is that the playback success rate of the target video is greater than the first preset value, that the target video is in the playable state; and the second determining unit is configured to determine, when the query result is that a playback success rate of the target video is less than a second preset value, that the target video is invalidated.

It should be noted herein that, the traversing unit, the query unit, the first determining unit, and the second determining unit may be run in the terminal as a part of the apparatus, and functions implemented by the foregoing units may be performed by using the processor in the terminal.

In some embodiments, the apparatus further includes: a clearing unit, configured to clear the ID of the target video from the preset queue after it is determined that the target video is in the playable state.

It should be noted herein that, the clearing unit may be run in the terminal as a part of the apparatus, and a function implemented by the foregoing unit may be performed by using the processor in the terminal.

In some embodiments, the apparatus further includes: a writing unit, configured to write the ID of the target video to a preset list after it is determined that the target video is invalidated; and clear the ID of the target video from the preset queue, where the preset list is used to store an ID of a video on which offline processing is to be performed.

It should be noted herein that, the writing unit may be run in the terminal as a part of the apparatus, and a function implemented by the foregoing unit may be performed by using the processor in the terminal.

In some embodiments, the apparatus further includes: a retaining unit, configured to retain, after query is performed on the reported information of the target video according to the ID of the target video, to obtain the query result, the ID of the target video in the preset queue when the query result is that a playback success rate of the target video is between the second preset value and the first preset value.

It should be noted herein that, the retaining unit may be run in the terminal as a part of the apparatus, and a function implemented by the foregoing unit may be performed by using the processor in the terminal.

It should be noted herein that, an example and an application scenario implemented by the foregoing units and modules are the same as those implemented by corresponding steps, but are not limited to content disclosed in the foregoing embodiments. It should be noted that, the foregoing units and modules may be run in the hardware environment shown in FIG. 1 as a part of the apparatus, and may be implemented by using software or may be implemented by using hardware, where the hardware environment includes a network environment.

According to still another aspect of the embodiments of the present disclosure, an electronic apparatus for implementing the foregoing video surveillance method is further provided.

Figure 22:
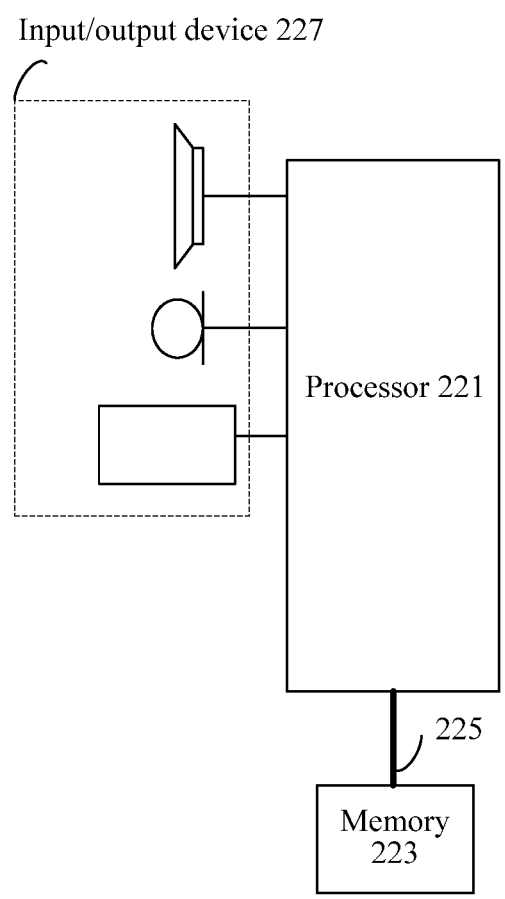
FIG. 22 is a structural block diagram of an electronic apparatus according to an embodiment of the present disclosure.

FIG. 22 is a structural block diagram of an electronic apparatus according to an embodiment of the present disclosure. As shown in FIG. 22, the terminal may include: one or more (only one is shown) processors 221, a memory 223, and a transmission apparatus 225. As shown in FIG. 22, the terminal may further include an input/output device 227.

The memory 223 may be configured to store a computer program and a module, such as a program instruction/module corresponding to the video surveillance method and apparatus in the embodiments of the present disclosure, and the processor 221 is configured to perform, by running a software program and a module stored in the memory 223, various function applications and data processing, that is, implement the foregoing video surveillance method. The memory 223 may include a high-speed random memory, and may also include a nonvolatile memory, for example, one or more magnetic storage devices, flash memories or other nonvolatile solid-state memories. In some embodiments, the memory 223 may further include memories remotely disposed relative to the processor 221, and these remote memories may be connected to the terminal through a network. Instances of the network include, but are not limited to, the Internet, an intranet, a local area network, a mobile communications network, and a combination thereof.

The transmission apparatus 225 is configured to receive or send data through a network, and may be further configured to transmit data between the processor and the memory. Specific examples of the foregoing network may include a wired network and a wireless network. In an example, the transmission apparatus 225 includes a network interface controller (NIC) that may be connected to another network device and a router by using a network cable, thereby communicating with the Internet or a local area network. In an example, the transmission apparatus 225 is a radio frequency (RF) module that is configured to communicate with the Internet in a wireless manner.

Specifically, the memory 223 is configured to store an application program.

The processor 221 may invoke, by using the transmission apparatus 225, the application program stored in the memory 223, so as to perform the following steps:

sending first video information of a target video to a first client in response to a first request, where the target video is played by an aggregate video website;

receiving reported information that is used to indicate a playback state of the target video and that is sent by the first client, where the reported information is obtained by playing, by the first client, a video source file of the target video according to original address information in the first video information;

updating a first-frame playback time stored on a first location in a multi-dimensional table according to a first first-frame playback time in the reported information, where dimensions in the multi-dimensional table are respectively used to indicate different pieces of playback information of a video, and the first location is determined according to the reported information;

obtaining, according to the first-frame playback time, a timeout waiting time in second video information sent to a second client; and sending the second video information to the second client in response to a second request, where when the second client does not play the target video in the timeout waiting time, the playback state of the target video is determined as unsuccessful playback.

The processor 221 is further configured to perform the following step: sending the first video information including alternate address information to the first client in response to the first request, where the alternate address information is address information of the video source file on a CDN, so that when the playback state is unsuccessful playback of the target video, the first client plays the target video according to the video source file stored on the CDN.

The processor 221 is further configured to perform the following steps: obtaining, according to the reported information, a first playback region to which the first client belongs; determining the first location in the multi-dimensional table according to a first source number of the target video, the first playback region, and a first network type of the target video, where the video information includes the first source number and the first network type, and dimensions in the multi-dimensional table are respectively used to indicate a source number of a video, a playback region, and a network type; and updating the first-frame playback time stored on the first location according to the first first-frame playback time in the reported information.

The processor 221 is further configured to perform the following steps: judging whether a second first-frame playback time is stored on the first location; obtaining an average playback time of the first first-frame playback time and the second first-frame playback time if it is judged that the second first-frame playback time is stored on the first location; and updating the second first-frame playback time to the average playback time.

The processor 221 is further configured to perform the following step: summarizing, according to a preset parameter every preset time, the first-frame playback time stored on the first location, to obtain the timeout waiting time, where the first-frame playback time is updated with the first video information sent by the first client at different times.

The processor 221 is further configured to perform the following step: establishing a first structural body corresponding to an ID of the target video according to the reported information after the reported information that is used to indicate the playback state of the target video and that is sent by the first client is received, where the reported information includes the ID of the target video, and the first structural body is used to indicate the reported information by using a preset field.

The processor 221 is further configured to perform the following steps: judge whether a second structural body corresponding to the ID of the target video exists; and updating the second structural body to the first structural body if it is judged that the second structural body corresponding to the ID of the target video exists.

The processor 221 is further configured to perform the following steps: obtaining a quantity of reporting times of the ID of the target video after the second structural body is updated to the first structural body; judging whether the quantity of reporting times is greater than the preset quantity of times; and storing the ID of the target video into a preset queue if it is judged that the quantity of reporting times is greater than the preset quantity of times, where the preset queue is used to store IDs of a plurality of videos, and a quantity of reporting times of each video of the plurality of videos is greater than the preset quantity of times.

The processor 221 is further configured to perform the following steps: traversing the preset queue after the ID of the target video is stored into the preset queue; performing query on the reported information of the target video according to the ID of the target video in the preset queue, to obtain a query result; and determining, when the query result is that the playback success rate of the target video is greater than a first preset value, that the target video is in a playable state; or determining, when the query result is that the playback success rate of the target video is less than a second preset value, that the target video is invalidated.

The processor 221 is further configured to perform the following step: clearing the ID of the target video from the preset queue after it is determined that the target video is in the playable state.

The processor 221 is further configured to perform the following step: writing the ID of the target video to a preset list after it is determined that the target video is invalidated, and clearing the ID of the target video from the preset queue, where the preset list is used to store an ID of a video on which offline processing is to be performed.

The processor 221 is further configured to perform the following step: after query is performed on the reported information of the target video according to the ID of the target video, to obtain the query result, retaining the ID of the target video in the preset queue when the query result is that a playback success rate of the target video is between the second preset value and the first preset value.

This embodiment of the present disclosure is used to provide a video surveillance solution. First video information of a target video is sent to a first client in response to a first request, where the target video is played by an aggregate video website; reported information that is used to indicate a playback state of the target video and that is sent by the first client is received, where the reported information is obtained by playing, by the first client, a video source file of the target video according to original address information in the first video information; a first-frame playback time stored on a first location in a multi-dimensional table is updated according to a first first-frame playback time in the reported information, where dimensions in the multi-dimensional table are respectively used to indicate different pieces of playback information of a video, and the first location is determined according to the reported information; a timeout waiting time in second video information sent to a second client is obtained according to the first-frame playback time; and the second video information is sent to the second client in response to a second request, where when the second client does not play the target video in the timeout waiting time, the playback state of the target video is determined as unsuccessful playback, thereby quickly determining whether the target video is invalidated, improving video surveillance efficiency, and further resolving the technical problem of low video surveillance efficiency in the related technology.

In some embodiments, for a specific example in this embodiment, refer to the examples described in the foregoing embodiments, and details are not described herein again in this embodiment.

Persons of ordinary skill in the art may understand that, the structure shown in FIG. 22 is only schematic. The electronic apparatus may be a terminal device such as a smartphone (such as an Android mobile phone or an iOS mobile phone), a tablet computer, a palmtop computer, a mobile Internet device (MID), or a PAD. FIG. 22 does not limit the structure of the foregoing electronic apparatus. For example, the electronic apparatus may further include more or less components (such as a network interface and a display apparatus) than those shown in FIG. 22, or has a configuration different from that shown in FIG. 22.

Persons of ordinary skill in the art may understand that all or a part of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

This embodiment of the present disclosure further provides a storage medium. In some embodiments, in this embodiment, the storage medium stores a computer program, where when being run, the computer program may be configured to perform a video surveillance method.

In some embodiments, in this embodiment, the storage medium may be located on at least one network device of a plurality of network devices in the network shown in the foregoing embodiment.

In some embodiments, in this embodiment, the storage medium is configured to store program code used to perform the following steps:

sending first video information of a target video to a first client in response to a first request, where the target video is played by an aggregate video website;

receiving reported information that is used to indicate a playback state of the target video and that is sent by the first client, where the reported information is obtained by playing, by the first client, a video source file of the target video according to original address information in the first video information;

updating a first-frame playback time stored on a first location in a multi-dimensional table according to a first first-frame playback time in the reported information, where dimensions in the multi-dimensional table are respectively used to indicate different pieces of playback information of a video, and the first location is determined according to the reported information;

a timeout waiting time in second video information sent to a second client is obtained according to the first-frame playback time; and the second video information is sent to the second client in response to a second request, where when the second client does not play the target video in the timeout waiting time, the playback state of the target video is determined as unsuccessful playback.

In some embodiments, the storage medium is further configured to store program code used to execute the following step: sending the first video information including alternate address information to the first client in response to the first request, where the alternate address information is address information of the video source file on a CDN, so that when the playback state is unsuccessful playback of the target video, the first client plays the target video according to the video source file stored on the CDN.

In some embodiments, the storage medium is further configured to store program code used to execute the following steps: obtaining, according to the reported information, a first playback region to which the first client belongs; determining the first location in the multi-dimensional table according to a first source number of the target video, the first playback region, and a first network type of the target video, where the video information includes the first source number and the first network type, and dimensions in the multi-dimensional table are respectively used to indicate a source number of a video, a playback region, and a network type; and updating the first-frame playback time stored on the first location according to the first first-frame playback time in the reported information.

In some embodiments, the storage medium is further configured to store program code used to execute the following steps: judging whether a second first-frame playback time is stored on the first location; obtaining an average playback time of the first first-frame playback time and the second first-frame playback time if it is judged that the second first-frame playback time is stored on the first location; and updating the second first-frame playback time to the average playback time.

In some embodiments, the storage medium is further configured to store program code used to execute the following step: summarizing, according to a preset parameter every preset time, the first-frame playback time stored on the first location, to obtain the timeout waiting time, where the first-frame playback time is updated with the first video information sent by the first client at different times.

In some embodiments, the storage medium is further configured to store program code used to execute the following step: establishing a first structural body corresponding to an ID of the target video according to the reported information after the reported information that is used to indicate the playback state of the target video and that is sent by the first client is received, where the reported information includes the ID of the target video, and the first structural body is used to indicate the reported information by using a preset field.

In some embodiments, the storage medium is further configured to store program code used to execute the following steps: judge whether a second structural body corresponding to the ID of the target video exists; and updating the second structural body to the first structural body if it is judged that the second structural body corresponding to the ID of the target video exists.

In some embodiments, the storage medium is further configured to store program code used to execute the following steps: obtaining a quantity of reporting times of the ID of the target video after the second structural body is updated to the first structural body; judging whether the quantity of reporting times is greater than the preset quantity of times; and storing the ID of the target video into a preset queue if it is judged that the quantity of reporting times is greater than the preset quantity of times, where the preset queue is used to store IDs of a plurality of videos, and a quantity of reporting times of each video of the plurality of videos is greater than the preset quantity of times.

In some embodiments, the storage medium is further configured to store program code used to execute the following steps: traversing the preset queue after the ID of the target video is stored into the preset queue; performing query on the reported information of the target video according to the ID of the target video in the preset queue, to obtain a query result; and determining, when the query result is that the playback success rate of the target video is greater than the first preset value, that the target video is in a playable state; or determining, when the query result is that the playback success rate of the target video is less than a second preset value, that the target video is invalidated.

In some embodiments, the storage medium is further configured to store program code used to execute the following step: clearing the ID of the target video from the preset queue after it is determined that the target video is in the playable state.

In some embodiments, the storage medium is further configured to store program code used to execute the following step: writing the ID of the target video to a preset list after it is determined that the target video is invalidated, and clearing the ID of the target video from the preset queue, where the preset list is used to store an ID of a video on which offline processing is to be performed.

In some embodiments, the storage medium is further configured to store program code used to execute the following step: after query is performed on the reported information of the target video according to the ID of the target video, to obtain the query result, retaining the ID of the target video in the preset queue when the query result is that a playback success rate of the target video is between the second preset value and the first preset value.

In some embodiments, for a specific example in this embodiment, refer to the examples described in the foregoing embodiments, and details are not described herein again in this embodiment.

In some embodiments, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

The video surveillance method and apparatus, the storage medium, and the electronic apparatus according to the present disclosure are described above by using examples with reference to the accompanying drawings. However, a person skilled in the art should understand that, various improvements may be further made for the video surveillance method and apparatus, the storage medium, and the electronic apparatus proposed in the present disclosure without departing from content of the present disclosure. Therefore, the protection scope of the present disclosure should be subject to content of the appended claims.

The sequence numbers of the preceding embodiments of the present disclosure are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the foregoing embodiments of the present disclosure, descriptions of the embodiments have different emphases, and as for parts that are not described in detail in one embodiment, reference can be made to the relevant description of the other embodiments.

In the several embodiments provided in this application, it should be understood that the disclosed client may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

The above descriptions are merely preferred embodiments of the present disclosure, and it should be noted that, a person of ordinary skill in the art may make various improvements and refinements without departing from the spirit of the present disclosure. All such modifications and refinements should also be intended to be covered by the present disclosure.

INDUSTRIAL PRACTICABILITY

First video information of a target video is sent to a first client in response to a first request, where the target video is played by an aggregate video website; reported information that is used to indicate a playback state of the target video and that is sent by the first client is received, where the reported information is obtained by playing, by the first client, a video source file of the target video according to original address information in the first video information; a first-frame playback time stored on a first location in a multi-dimensional table is updated according to a first first-frame playback time in the reported information, where dimensions in the multi-dimensional table are respectively used to indicate different pieces of playback information of a video, and the first location is determined according to the reported information; a timeout waiting time in second video information sent to a second client is obtained according to the first-frame playback time; and the second video information is sent to the second client in response to a second request, where when the second client does not play the target video in the timeout waiting time, the playback state of the target video is determined as unsuccessful playback, thereby quickly determining whether the target video is invalidated, improving video surveillance efficiency, and further resolving the technical problem of low video surveillance efficiency in the related technology.

What is claimed is:

1. A video surveillance method performed at a server having one or more processors and memory storing a plurality of programs to be executed by the one or more processors, the method comprising:
sending first video information of a target video to a first client in response to a first request from the first client, the target video being played by an aggregate video website;
receiving first reported information that is used to indicate a playback state of the target video at the first client and that is sent by the first client, the first reported information being obtained by playing, by the first client, a video source file of the target video according to original address information in the first video information and the first reported information including an initial time of playing a first frame of the target video as a first-frame playback time;
updating an existing first-frame playback time stored on a first location in a multi-dimensional table according to the first-frame playback time in the first reported information from the first client, dimensions in the multi-dimensional table being respectively used to indicate different pieces of playback information of a video, and the first location is determined according to the first reported information;
obtaining a second request for the target video from a second client;
in response to the second request:
inserting, according to the first-frame playback time, a timeout waiting time into second video information sent to a second client;
sending the second video information of the target video to the second client; and receiving second reported information, the second reported information indicating that a failed playback state of the target video at the second client when the second client does not start playing the first frame of the target video within the timeout waiting time.

2. The method according to claim 1, wherein the operation of sending first video information of a target video to a first client in response to a first request from the first client further comprises:
sending the first video information comprising alternate address information to the first client in response to the first request, wherein the alternate address information is address information of the video source file on a content delivery network (CDN), so that when the playback state is unsuccessful playback of the target video, the first client plays the target video according to the video source file stored on the CDN.

3. The method according to claim 1, wherein the operation of updating a first-frame playback time stored on a first location in a multi-dimensional table according to a first first-frame playback time in the reported information further comprises:
obtaining, according to the reported information, a first playback region to which the first client belongs;
determining the first location in the multi-dimensional table according to a first source number of the target video, the first playback region, and a first network type of the target video, wherein the video information comprises the first source number and the first network type, and the dimensions in the multi-dimensional table are respectively used to indicate a source number of the video, a playback region, and a network type; and
updating the first-frame playback time stored on the first location according to the first first-frame playback time in the reported information.

4. The method according to claim 3, wherein the operation of updating the first-frame playback time stored on the first location according to the first first-frame playback time in the reported information further comprises:
judging whether a second first-frame playback time is stored on the first location;
obtaining an average playback time of the first first-frame playback time and the second first-frame playback time if it is judged that the second first-frame playback time is stored on the first location; and
updating the second first-frame playback time to the average playback time.

5. The method according to claim 1, wherein the operation of obtaining, according to the first-frame playback time, a timeout waiting time in second video information sent to a second client further comprises:
summarizing, according to a preset parameter every preset time, the first-frame playback time stored on the first location, to obtain the timeout waiting time, wherein the first-frame playback time is updated with the first video information sent by the first client at different times.

6. The method according to claim 1, further comprising:
after receiving reported information that is used to indicate a playback state of the target video and that is sent by the first client:
establishing a first structural body corresponding to an ID of the target video according to the reported information, wherein the reported information comprises the ID of the target video, and the first structural body is used to indicate the reported information by using a preset field.

7. The method according to claim 6, wherein the operation of establishing a first structural body corresponding to an ID of the target video according to the reported information further comprises:
judging whether a second structural body corresponding to the ID of the target video exists; and
updating the second structural body to the first structural body if it is judged that the second structural body corresponding to the ID of the target video exists.

8. The method according to claim 7, further comprising:
after updating the second structural body to the first structural body:
obtaining a quantity of reporting times of the ID of the target video;
judging whether the quantity of reporting times is greater than a preset quantity of times; and
storing the ID of the target video into a preset queue if it is judged that the quantity of reporting times is greater than the preset quantity of times, wherein the preset queue is used to store IDs of a plurality of videos, and a quantity of reporting times of each video of the plurality of videos is greater than the preset quantity of times.

9. The method according to claim 8, further comprising:
after storing the ID of the target video into a preset queue:
traversing the preset queue;
performing query on the reported information of the target video according to the ID of the target video in the preset queue, to obtain a query result; and
determining, when the query result is that a playback success rate of the target video is greater than a first preset value, that the target video is in a playable state; or
determining, when the query result is that a playback success rate of the target video is less than a second preset value, that the target video is invalidated.

10. The method according to claim 9, further comprising:
after determining that the target video is in a playable state:
clearing the ID of the target video from the preset queue.

11. The method according to claim 9, further comprising:
after determining that the target video is invalidated:
writing the ID of the target video to a preset list, and clearing the ID of the target video from the preset queue, wherein the preset list is used to store an ID of a video on which offline processing is to be performed.

12. The method according to claim 9, further comprising:
after performing query on the reported information of the target video according to the ID of the target video, to obtain a query result:
retaining the ID of the target video in the preset queue when the query result is that a playback success rate of the target video is between the second preset value and the first preset value.

13. The method according to claim 6, wherein the first structural body comprises at least one of the following:
video number information;
video type information;
video source information;
a quantity of successful playback times;
a quantity of unsuccessful playback times; and
a playback success rate.

14. A server for video surveillance, comprising one or more processors, memory coupled to the one or more processors, and a plurality of computer-readable instructions that, when executed by the one or more processors, cause the server to perform the following operations:

sending first video information of a target video to a first client in response to a first request from the first client, the target video being played by an aggregate video website;

receiving first reported information that is used to indicate a playback state of the target video at the first client and that is sent by the first client, the first reported information being obtained by playing, by the first client, a video source file of the target video according to original address information in the first video information and the first reported information including an initial time of playing a first frame of the target video as a first-frame playback time;

updating an existing first-frame playback time stored on a first location in a multi-dimensional table according to the first-frame playback time in the first reported information from the first client, dimensions in the multi-dimensional table being respectively used to indicate different pieces of playback information of a video, and the first location is determined according to the first reported information;

obtaining a second request for the target video from a second client;

in response to the second request:
inserting, according to the first-frame playback time, a timeout waiting time into second video information sent to a second client;
sending the second video information of the target video to the second client; and
receiving second reported information, the second reported information indicating that a failed playback state of the target video at the second client when the second client does not start playing the first frame of the target video within the timeout waiting time.

15. The server according to claim 14, wherein the operation of sending first video information of a target video to a first client in response to a first request from the first client further comprises:

sending the first video information comprising alternate address information to the first client in response to the first request, wherein the alternate address information is address information of the video source file on a content delivery network (CDN), so that when the playback state is unsuccessful playback of the target video, the first client plays the target video according to the video source file stored on the CDN.

16. The server according to claim 14, wherein the operation of updating a first-frame playback time stored on a first location in a multi-dimensional table according to a first first-frame playback time in the reported information further comprises:

obtaining, according to the reported information, a first playback region to which the first client belongs;

determining the first location in the multi-dimensional table according to a first source number of the target video, the first playback region, and a first network type of the target video, wherein the video information comprises the first source number and the first network type, and the dimensions in the multi-dimensional table are respectively used to indicate a source number of the video, a playback region, and a network type; and updating the first-frame playback time stored on the first location according to the first first-frame playback time in the reported information.

17. The server according to claim 16, wherein the operation of updating the first-frame playback time stored on the first location according to the first first-frame playback time in the reported information further comprises:

judging whether a second first-frame playback time is stored on the first location;

obtaining an average playback time of the first first-frame playback time and the second first-frame playback time if it is judged that the second first-frame playback time is stored on the first location; and updating the second first-frame playback time to the average playback time.

18. The server according to claim 14, wherein the operation of obtaining, according to the first-frame playback time, a timeout waiting time in second video information sent to a second client further comprises:

summarizing, according to a preset parameter every preset time, the first-frame playback time stored on the first location, to obtain the timeout waiting time, wherein the first-frame playback time is updated with the first video information sent by the first client at different times.

19. The server according to claim 14, wherein the operations further comprise:

after receiving reported information that is used to indicate a playback state of the target video and that is sent by the first client:

establishing a first structural body corresponding to an ID of the target video according to the reported information, wherein the reported information comprises the ID of the target video, and the first structural body is used to indicate the reported information by using a preset field.

20. A non-transitory computer readable storage medium storing a plurality of instructions in connection with a server having one or more processors for video surveillance, wherein the plurality of instructions, when executed by the one or more processors, cause the server to perform a plurality of operations including:

sending first video information of a target video to a first client in response to a first request from the first client, the target video being played by an aggregate video website;

receiving first reported information that is used to indicate a playback state of the target video at the first client and that is sent by the first client, the first reported information being obtained by playing, by the first client, a video source file of the target video according to original address information in the first video information and the first reported information including an initial time of playing a first frame of the target video as a first-frame playback time;

updating an existing first-frame playback time stored on a first location in a multi-dimensional table according to the first-frame playback time in the first reported information from the first client, dimensions in the multi-dimensional table being respectively used to indicate different pieces of playback information of a video, and the first location is determined according to the first reported information;

obtaining, according to the first-frame playback time, a timeout waiting time in second video information sent to a second client; and obtaining a second request for the target video from a second client;

in response to the second request:
- inserting, according to the first-frame playback time, a timeout waiting time into second video information sent to a second client;
- sending the second video information of the target video to the second client; and
- receiving second reported information, the second reported information indicating that a failed playback state of the target video at the second client when the second client does not start playing the first frame of the target video within the timeout waiting time.

* * * * *